US011628909B2

(12) United States Patent
Ljøsne et al.

(10) Patent No.: US 11,628,909 B2
(45) Date of Patent: Apr. 18, 2023

(54) COASTING CLUTCH AND A MULTISPEED GEAR SYSTEM WITH SUCH COASTING CLUTCH

(71) Applicant: CA TECHNOLOGY SYSTEMS AS, Oslo (NO)

(72) Inventors: Knut Tore Ljøsne, Oslo (NO); Christian Antal, Oslo (NO)

(73) Assignee: CA TECHNOLOGY SYSTEMS AS, Oslo (NO)

( * ) Notice: Subject to any disclaimer, the term of this patent is extended or adjusted under 35 U.S.C. 154(b) by 0 days.

(21) Appl. No.: 17/415,894

(22) PCT Filed: Dec. 15, 2019

(86) PCT No.: PCT/NO2019/050275
§ 371 (c)(1),
(2) Date: Jun. 18, 2021

(87) PCT Pub. No.: WO2020/130841
PCT Pub. Date: Jun. 25, 2020

(65) Prior Publication Data
US 2022/0073169 A1     Mar. 10, 2022

(30) Foreign Application Priority Data

Dec. 21, 2018   (NO) .................................... 20181673

(51) Int. Cl.
*F16H 3/66*      (2006.01)
*B62M 11/18*     (2006.01)
(Continued)

(52) U.S. Cl.
CPC ........... *B62M 11/18* (2013.01); *B62M 11/145* (2013.01); *F16D 21/00* (2013.01);
(Continued)

(58) Field of Classification Search
CPC .......... F16D 41/24; F16D 41/06; F16D 41/02; F16D 21/02; F16H 41/24; F16H 3/66;
(Continued)

(56) References Cited

U.S. PATENT DOCUMENTS 6,048,287 A     4/2000   Rohloff
6,155,394 A    12/2000   Shook
(Continued)

FOREIGN PATENT DOCUMENTS

CN     102748454 A  *  10/2012
DE     197 20 796 A1    11/1998
(Continued)

OTHER PUBLICATIONS

International Search Report for PCT/NO2019/050275 (PCT/ISA/210) dated Mar. 25, 2020.
(Continued)

*Primary Examiner* — Roger L Pang
(74) *Attorney, Agent, or Firm* — Birch, Stewart, Kolasch & Birch, LLP

(57) ABSTRACT

A coasting clutch and a gear system with a coasting clutch include mutually facing first and second clutch members. The coasting clutch is arranged to operate in an engaged position, wherein the first and second clutch members are axially in mesh and rotating with the same speed, or over-running and rotating with different speeds. The coasting clutch includes a coasting mechanism arranged to operate the coasting clutch into a coasting position when the clutch is overrunning. In the coasting position, the first and second clutch members are axially arranged further from each other than in the engaged position.

12 Claims, 16 Drawing Sheets

(51) Int. Cl.
    *B62M 11/14*    (2006.01)
    *F16D 21/00*    (2006.01)
    *F16D 41/24*    (2006.01)
    *F16D 21/02*    (2006.01)

(52) U.S. Cl.
    CPC ............... *F16D 41/24* (2013.01); *F16H 3/66* (2013.01); *F16D 21/02* (2013.01); *F16H 2200/201* (2013.01); *F16H 2200/2007* (2013.01); *F16H 2200/2046* (2013.01); *F16H 2200/2051* (2013.01); *F16H 2200/2079* (2013.01)

(58) Field of Classification Search
    CPC ....... F16H 2200/2007; F16H 2200/201; F16H 2200/2079; F16H 2200/2082; F16H 2200/2084; F16H 2200/2087; F16H 2200/2092; F16H 2200/2046; B62M 11/18; B62M 11/14
    USPC ........................................................ 475/270
    See application file for complete search history.

(56) References Cited

U.S. PATENT DOCUMENTS

| | | |
|---|---|---|
| 9,199,509 B2 | 12/2015 | Koshiyama |
| 9,279,480 B2 | 3/2016 | Antal et al. |
| 2010/0320720 A1 | 12/2010 | Bezerra et al. |
| 2018/0083384 A1* | 3/2018 | Burns ................... H01R 13/622 |
| 2020/0032855 A1* | 1/2020 | Walz ..................... B25B 23/141 |

FOREIGN PATENT DOCUMENTS

| | | |
|---|---|---|
| DE | 20 2010 012 075 U1 | 11/2010 |
| DE | 102017202338 A1 * | 8/2018 |
| EP | 0 679 570 A2 | 11/1995 |
| JP | 2009516146 A * | 4/2009 |
| WO | WO 2012/128639 A1 | 9/2012 |
| WO | WO 2017/167453 A1 | 10/2017 |

OTHER PUBLICATIONS

Written Opinion of the International Searching Authority for PCT/NO2019/050275 (PCT/ISA/237) dated Mar. 25, 2020.

* cited by examiner

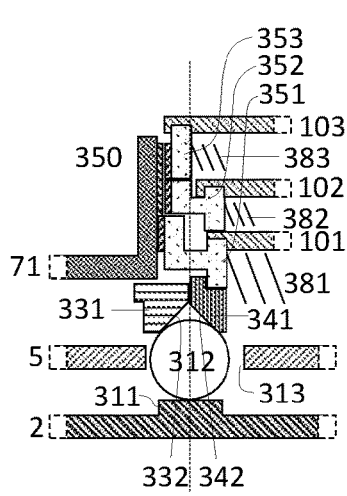
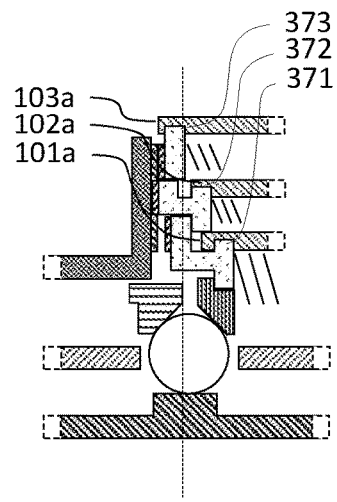
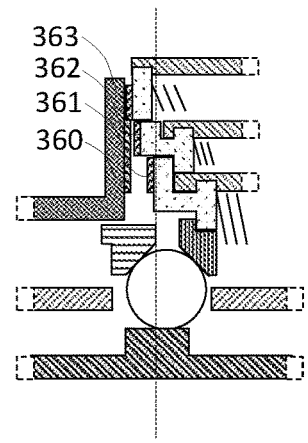
Fig. 4a　　　Fig. 4b　　　Fig. 4c
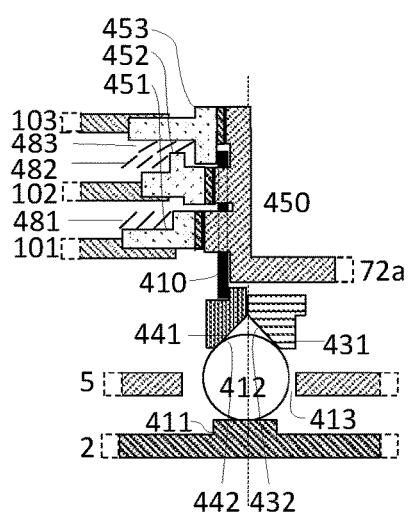
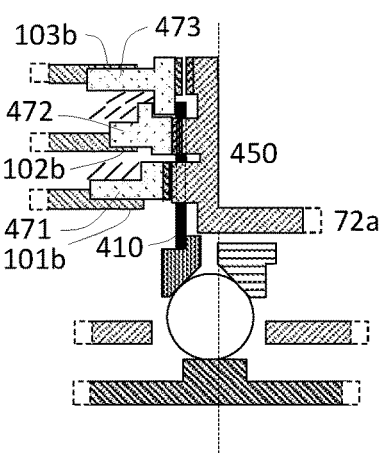
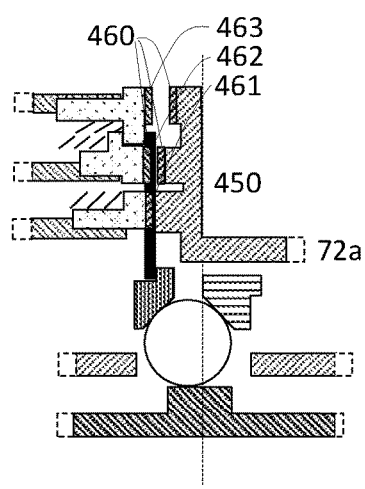
Fig. 5a　　　Fig. 5b　　　Fig. 5c

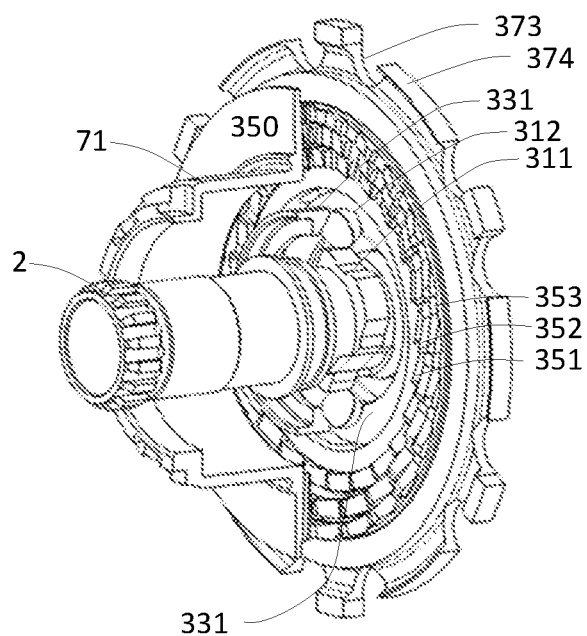 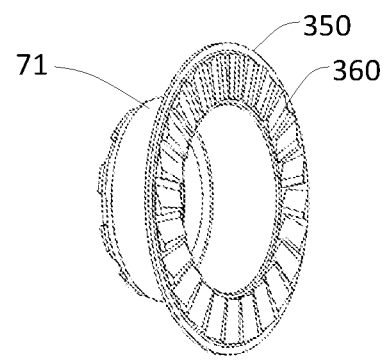
Fig. 6a  Fig. 6b
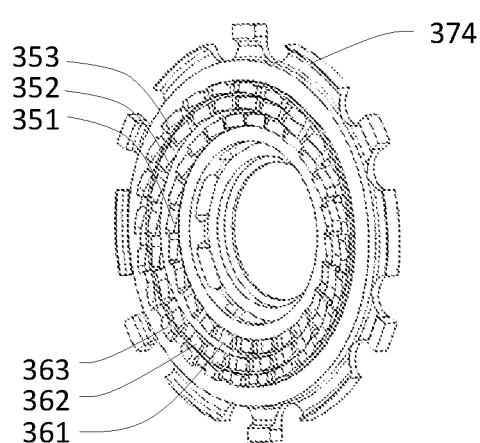 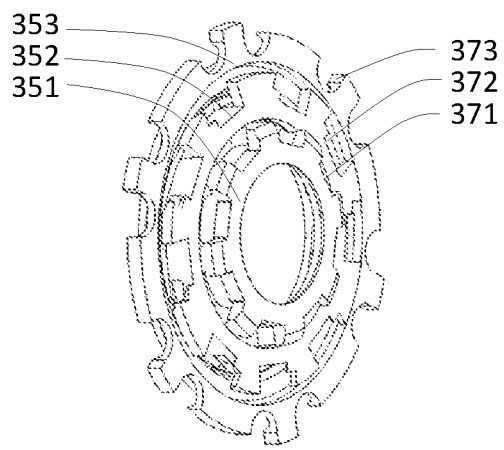
Fig. 6c  Fig. 6d

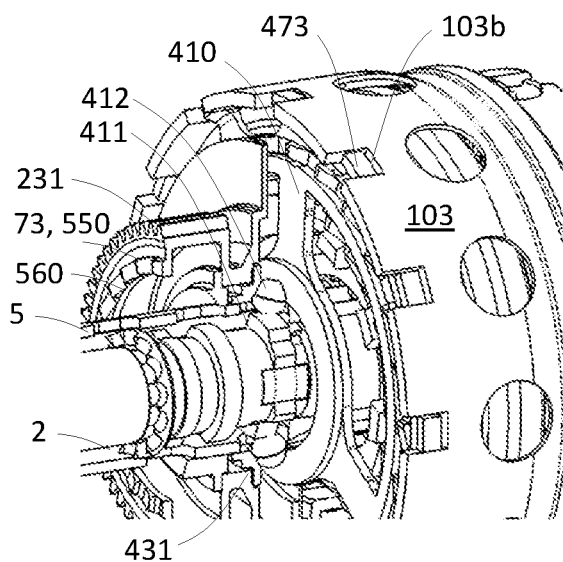
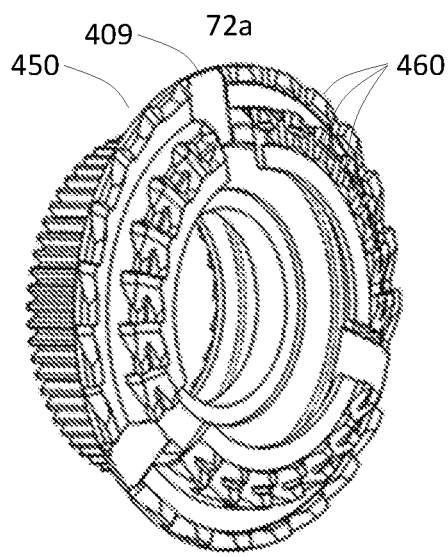
Fig. 7a  Fig. 7b
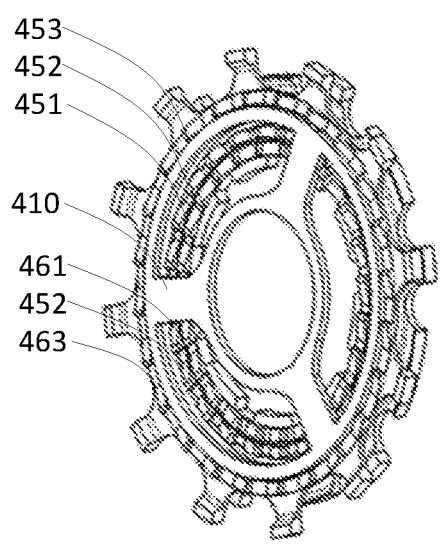
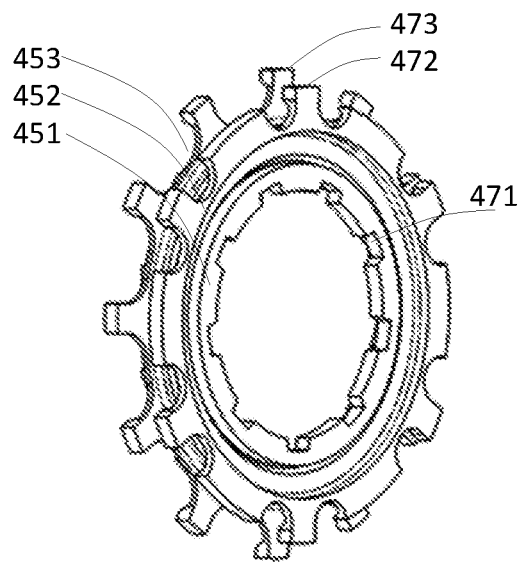
Fig. 7c  Fig. 7d

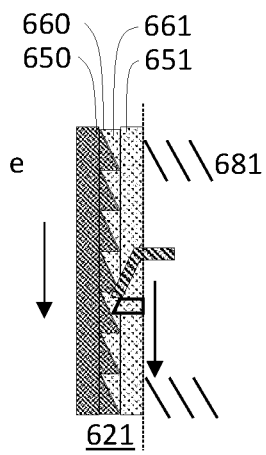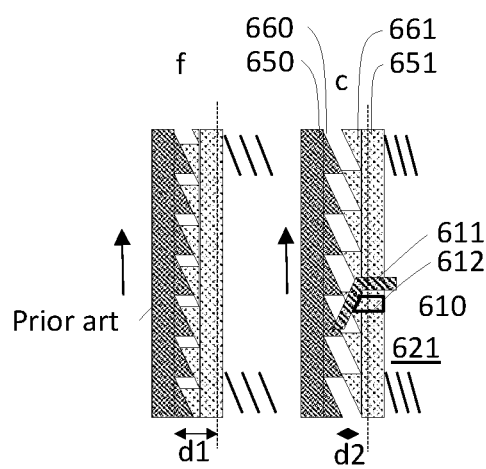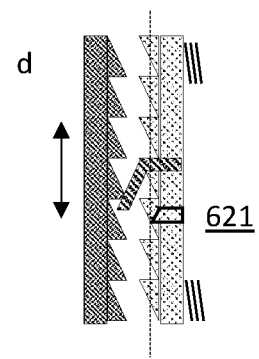
Fig. 13a          Fig. 13b          Fig. 13c
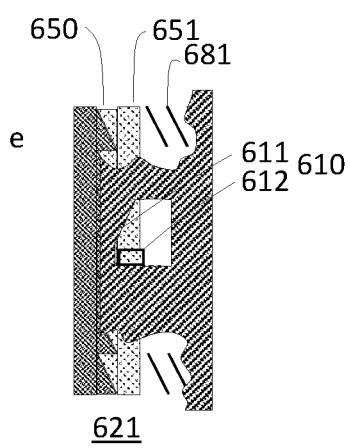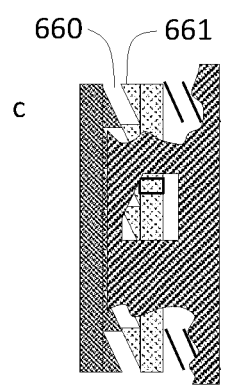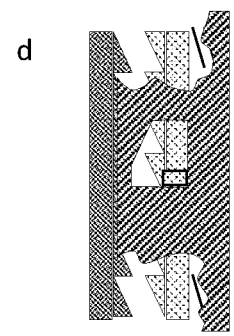
Fig. 13d          Fig. 13e          Fig. 13f

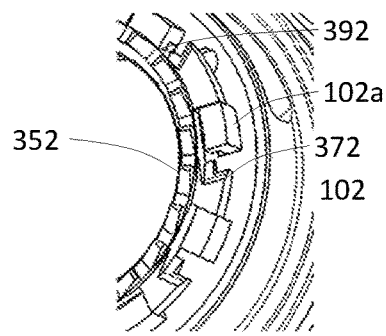
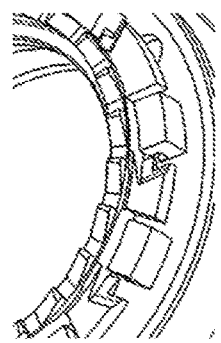
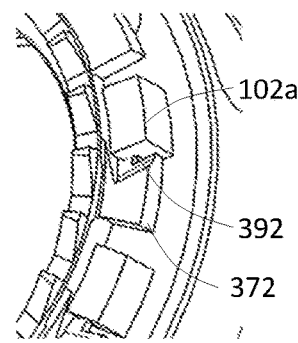
Fig. 15a        Fig. 15b        Fig. 15c
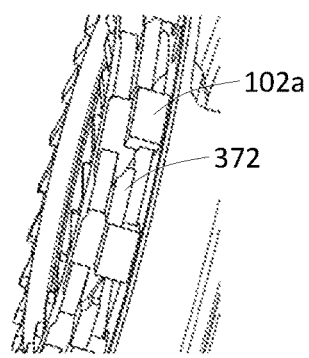
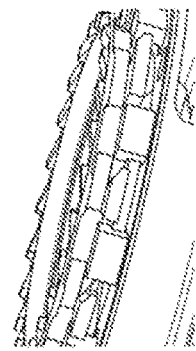
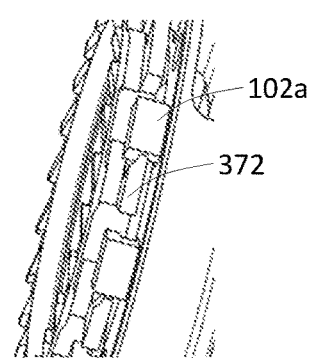
Fig. 15d        Fig. 15e        Fig. 15f
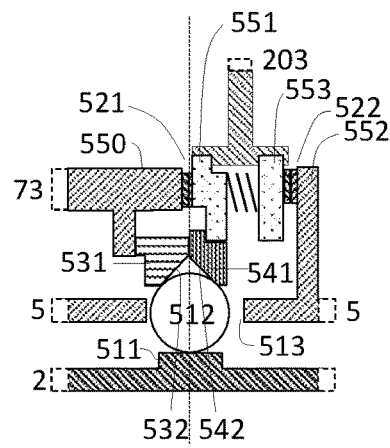
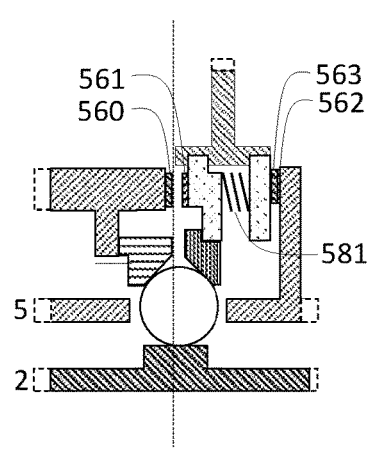
Fig. 16a        Fig. 16b ND A MULTISPEED
COASTING CLUTCH AND A MULTISPEED GEAR SYSTEM WITH SUCH COASTING CLUTCH

TECHNICAL FIELD

The present invention relates to a clutch with a coasting mechanism that may be used in multispeed gear systems such as e.g. a pedally propelled vehicle multispeed gear system, or as part of other transmission systems.

BACKGROUND

Internal gear mechanisms for pedally vehicles are experiencing resurgence in popularity due to their robustness, long service life, and recent technological improvements. When external gears, which are exposed and prone to impacts, deteriorate quickly, and require frequent maintenance, are shifted, the chain bends sideways and its bushings wear and stretch which causes cogs and chain rings to wear prematurely.

Internal gears are in this sense more optimal, but typical multispeed internal gear ones cannot handle the high torque of rider and assist motor. Most internal gears are shifted solely by means of pawls, or as in the case of e.g. DE19720796, with both pawls and axial clutches, although U.S. Pat. No. 9,279,480 offers improvement on many levels. Further optimization are desirable, to simplify, reduce cost, and improve function.

One such element is the coasting mechanism. In externally geared hubs, some mechanisms are proposed that partially decouple and thus improves effects of freewheeling. U.S. Pat. No. 6,155,394 shows pawls which substantially decouple from ratchet teeth during coasting, while WO2017167453 offers a geometrical solution in a complex machined tooth-ring from which linear pawls may partially decouple, and U.S. Pat. No. 9,199,509 describes spiral ears that allow axial clutch rings to partially decouple during freewheel/coasting. Since the hubs have only two states, one of torque coupling engagement and another of freewheeling, operation of the mechanisms is fairly simple. In internal hub gears, the mechanisms are more complex and various solutions are proposed.

EP0679570 shows classic rolling ball or rollers, which are automatically slid between wedge shaped races either into freewheel or into a narrowing, causing the races to lock. While allowing silent coasting, a potentially destructive radial expansion force is transferred onto the races during torque transfer.

A further challenge is how to simplify assembly, e.g. make a gear stack tolerance precise and how to close the gear hub, so as to provide an optimum gear stack width given the mechanism of an internal gear stack. Traditionally, the hub is provided with large diameter locking ball bearings, which is a heavy and costly means, and the hub end cover is either screwed onto the hub shell, or held in place with bolts, where neither of these solutions are optimal. Often the axle is threaded and a nut with a ball bearing race is tightened manually to what is assumed a proper fit.

Some of the challenges above have been addressed in WO2012128639A1, but structural and functional issues remain to be solved.

From the discussion above there is a need for improvements in clutches and more precisely to reduce noise and reduce losses in clutches.

SHORT SUMMARY

A goal with the present invention is to overcome the problems of prior art.

The invention, solving problems related to coasting, is a coasting clutch according to the independent claims. The coasting clutch reduces noise and lag of the clutch during freewheeling.

The invention solving the above-mentioned problems is also, in an aspect, a multi speed gear system with such clutch according to the independent claims.

The functionality of the multi speed gear system is improved over prior art multi speed gear systems. Further, the number of components have been reduced, and assembly and maintenance have been simplified. This in turn allows the total cost of the gear to be reduced.

BRIEF DESCRIPTION OF THE DRAWINGS

FIGS. 4a, 4b, and 4c illustrate different positions of the clutches of the first shift mechanism (30).

In FIG. 4a, the first inner clutch element (351) is engaged with the first common clutch element (350), while the first middle and outer clutch elements (352, 353) are freewheeling. Torque is here transferred from the first shaft (71) to the first inner carrier (101).

In FIG. 4b, the first middle clutch element (352) is engaged with the first common clutch element (350), while the first outer clutch element (353) is free-wheeling and the first inner clutch element (351) is disengaged. Torque is here transferred from the first shaft (71) to the first middle carrier (102).

In FIG. 4c, the first outer clutch element (353) is engaged with the first common clutch element (350), while the first inner and middle clutch elements (351, 352) are disengaged. Torque is here transferred from the first shaft (71) to the first outer carrier (103).

FIGS. 5a, 5b, and 5c illustrate different positions of the clutches of the second shift mechanism (40).

In FIG. 5a, the second outer clutch element (453) is engaged with the second common clutch element (450), while the second inner and middle clutch elements (451, 452) are free-wheeling. Torque is here transferred from the first outer carrier (103) to the second shaft (72a).

In FIG. 5b, the second middle clutch element (452) is engaged with the second common clutch element (450), while the second inner clutch element (451) is free-wheeling and the second outer clutch element (453) is disengaged. Torque is here transferred from the first middle carrier (102) to the second shaft (72a).

In FIG. 5c, the second inner clutch element (451) is engaged with the second common clutch element (450), while the second middle and outer clutch elements (452, 453) are disengaged. Torque is here transferred from the first inner carrier (101) to the second shaft (72a).

FIGS. 6a, 6b, 6c, 6d, 6e and 6f illustrate in perspective and partly cut away views, some elements related to the first shift mechanism (30) of an embodiment of the invention.

FIGS. 7a, 7b, 7c, 7d, 7e, 7f, 7g, and 7h illustrate in perspective and partly cut away views, some elements related to the second shift mechanism (40) of an embodiment of the invention.

FIG. 13a, 13b, 13c, illustrate in an embodiment a clutch of the invention in engaged, coasting, and disengaged positions respectively, as well as a coasting means.

FIGS. 13d, 13e, and 13f illustrate in an embodiment a clutch of the invention in engaged, coasting and disengaged positions respectively, as well as a coasting means.

FIGS. 15a, 15b, 15c, 15d, 15e, and 15f illustrate in perspective and partly cut-away views the coasting means for the first middle clutch element (352).

FIGS. 16a and 16b illustrate different positions of the third and fourth clutches (521, 522) of the third shift mechanism (50).

In FIG. 16a, the third inner clutch element (551) is engaged with the third common clutch element (550), while the fourth first and second clutch elements (552, 553) are free-wheeling. The third shaft (73) is here locked to the second outer carrier (203).

In FIG. 16b, the third inner clutch element (551) is disengaged from the third common clutch element (550), while the fourth first and second clutch elements (552, 553) are engaged, so that the second outer carrier (203) is locked to the main shaft (5).

EMBODIMENTS OF THE INVENTION

Figure 1A:
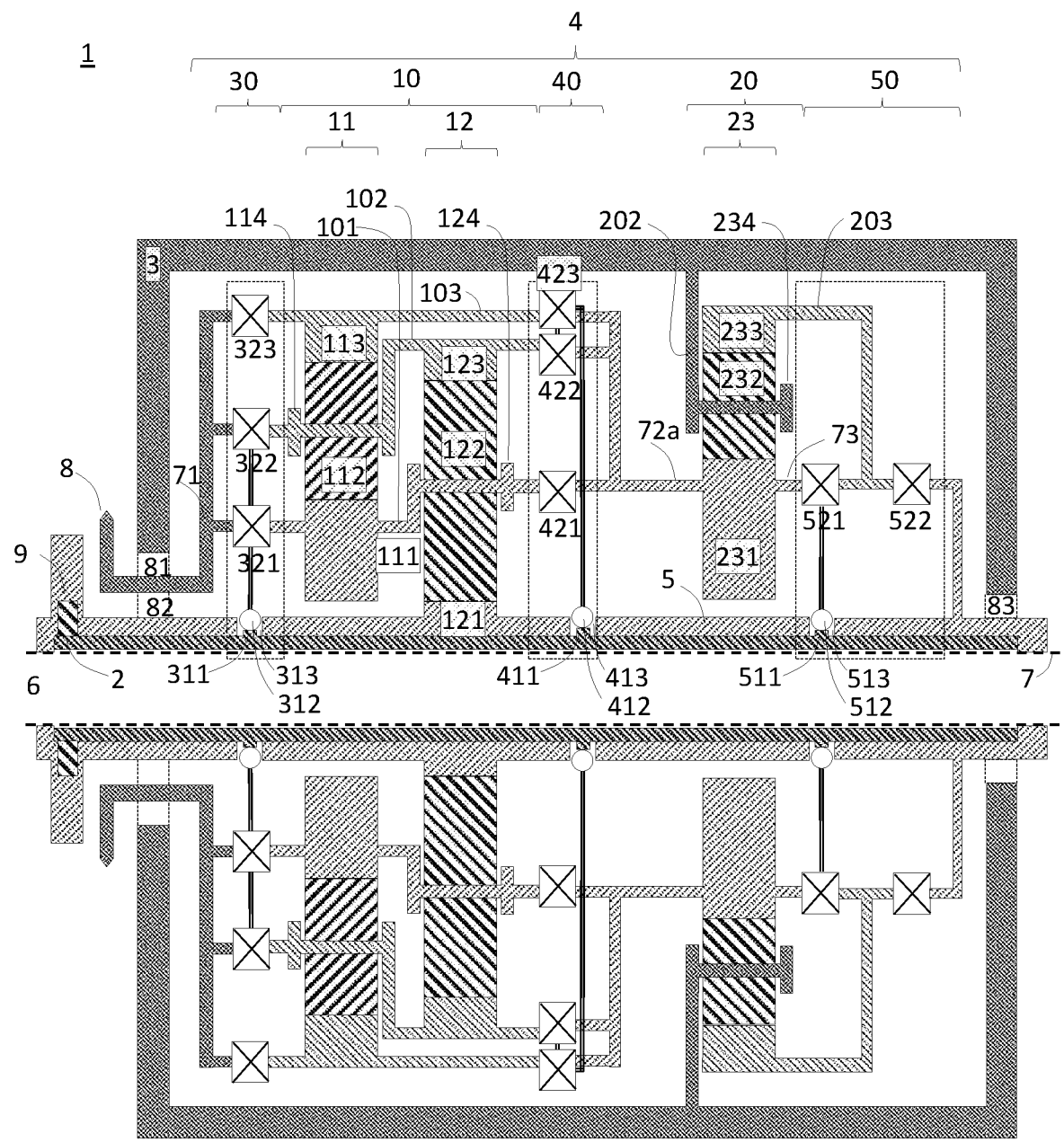
FIG. 1a illustrates a schematic view of an embodiment of the multi speed gear system of the invention. The main shaft (5) is arranged to be fixed to frame ends of a pedally propelled vehicle by a through bolt (7), and the gear mechanisms (4) transfers torque from the first shaft (71), in this case directly connected to a chain cog (8) to the hub shell (3). In this embodiment the gear mechanism (4) comprises a first gear section (10) and a second gear section (20) interconnected by a second shaft (72), where the second gear section (20) is a reduction gear. The first gear section (10) comprises first and a second planetary gear sets (11, 12) interconnected by first inner, middle, and outer carriers (101, 102, 103). Radially operated first and second shift mechanisms (30, 40) are arranged to provide releasable one way couplings between the input shaft (71) and the carriers (101, 102, 103), and between the carriers (101, 102, 103) and the second shaft (72), respectively. This gear system may have a total of 14 different gear ratios. Some elements not belonging to the same cross section in a real embodiment have been added here to illustrate the principle of operation.

In the following description, various examples and embodiments of the invention are set forth in order to provide the skilled person with a more thorough understanding of the invention. The specific details described in the context of the various embodiments and with reference to the attached drawings are not intended to be construed as limitations. Rather, the scope of the invention is defined in the appended claims.

Most of the embodiments described below are indexed. In addition, dependent embodiments defined in relation to the numbered embodiments are described. Unless otherwise specified, any embodiment that can be combined with one or more numbered embodiments may also be combined directly with any of the dependent embodiments of the numbered embodiment(s) referred to.

Gear Sections

In the embodiment illustrated in FIG. 1, the invention is a multispeed internal gear system (1) comprising a main shaft (5), a hub shell (3) rotatably mounted onto said main shaft (1), a gear mechanisms (4), driven by a cog (8) and in turn driving the hub shell (3). The main shaft (5) is arranged to be fixed to a frame of a vehicle, while the hub shell (5) is arranged to be fixed to a rim of the vehicle.

A hollow, selectively operable rotatable shift axle (2) is radially arranged within the main shaft (5), and centrally within the shift axle (2) is a tunnel (6) for receiving a slidedly mounted through-bolt (not shown), for fixing the main shaft (5) to the frame.

A first shaft (71) is coaxially and rotatably mounted between the main shaft (5) and the hub shell (3) by means of an inbound first inner bearing (81) between the main shaft (5) and the first shaft (71), and a first outer bearing (82) between the first shaft (71) and the hub shell (3). The cog (8) drives the first shaft (71).

The gear mechanisms (4) may comprise a first gear section (10) with cascade-coupled first and second epicyclical gear sets (11, 12).

The first epicyclical gear set (11) comprises a first sun gear, first planetary gears, and a first ring gear (111, 112, 113), and the second epicyclical gear set (11) comprises a second sun gear, second planetary gears, and a second ring gear (121, 122, 123). The first planetary gears (112) are rotatably mounted to a first planet holder (114), and the second planetary gears (122) are rotatably mounted to a second planet holder (124). The first and second planet holders (114, 124) are concentric with respect to the main shaft (5).

The second sun gear (121) is nonrotatably fixed to the main shaft (5).

The first gear section (10) further comprises three concentric carrier elements: a first inner carrier (101), interconnecting the first sun gear (111) with the second planet holder (124), a first middle carrier (102), interconnecting the first planet holder (114) with the second ring gear (123), and a first outer carrier (103), connected to the first ring gear (113).

The first ring gear (113) is provided as part of the first outer carrier (103), the second ring gear (123) and the first planet holder (114) are provided as part of the first middle carrier (102), and the second planet holder (124) and the first sun gear (111) are provided as part of the first inner carrier (101).

The three concentric carrier elements (101, 102, 103) rotate with thereinbetween fixed drive ratios around the main shaft (1), where the first outer carrier (103) rotates faster than the first middle carrier (102), and the first middle carrier (102) rotates faster than the first inner carrier (101).

The second gear section (20) is working as a reduction gear, and comprises a third epicyclical gear set (23), comprising a third sun gear, third planetary gears and a third ring gear (231, 232, 233). The third planetary gears (232) are rotatably mounted to a third planet holder (234), nonrotatably connected to the hub shell (3), transferring the output torque to the wheel connected to the hub shell (3). The third planet holder (234) is concentric with respect to the main shaft (5).

The first and second gear sections (10, 20) are interconnected by a second shaft (72a), concentrically encircling the main shaft (1), and arranged for transferring torque from any of the first inner, middle or outer carriers (101, 102, 103) to the third sun gear (231), which the second shaft (72a) is non-rotatably connected to.

Shift Mechanism

In FIG. 1, the gear mechanism (4) is operated by a first, second, and third shift mechanism (30, 40, 50), illustrated partly schematically inside dotted lines.

The shift axle (2) has first, second, and third radial shift cams (311, 411, 511) arranged circumferentially around the shift axle (2), and operating first, second, and third shift balls (312, 412, 512) radially, through first, second, and third openings (313, 413, 513) in the main shaft (5).

Figure 1B:
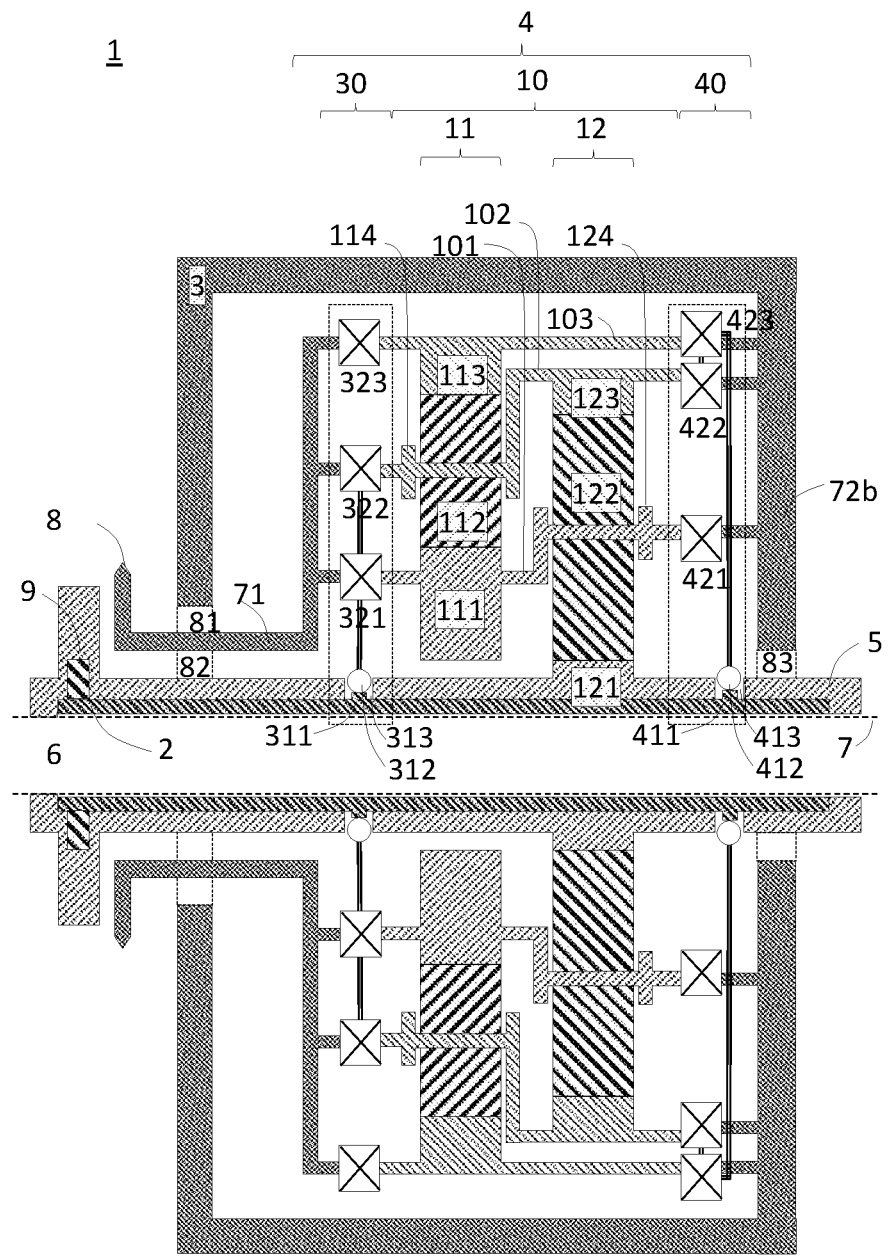
FIG. 1b illustrates an embodiment of the multi speed gear system similar to the system illustrated in FIG. 1a, the difference being that there is no reduction gear and that the second shaft (72b) is directly connected to or integrated with the hub shell (3). This gear system may have a total of 7 different gear ratios.
Figure 2:
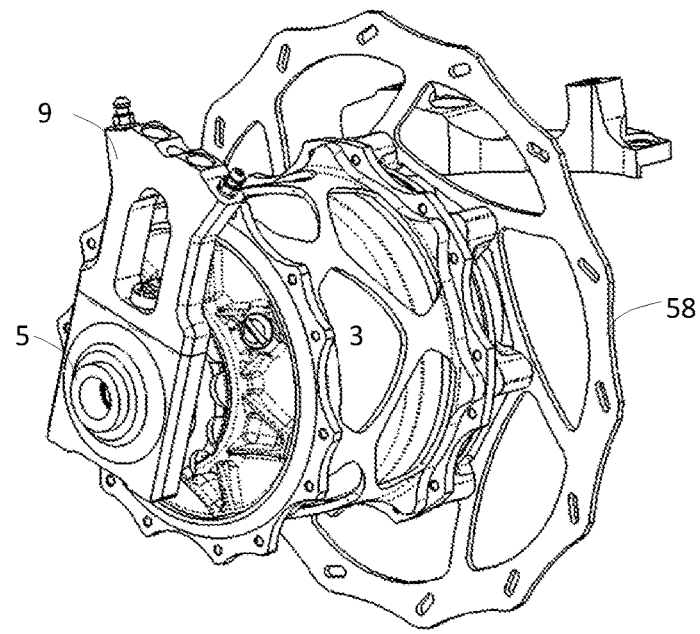
FIG. 2 illustrates in a perspective view a multi speed gear system of an embodiment of the invention.
Figure 3:
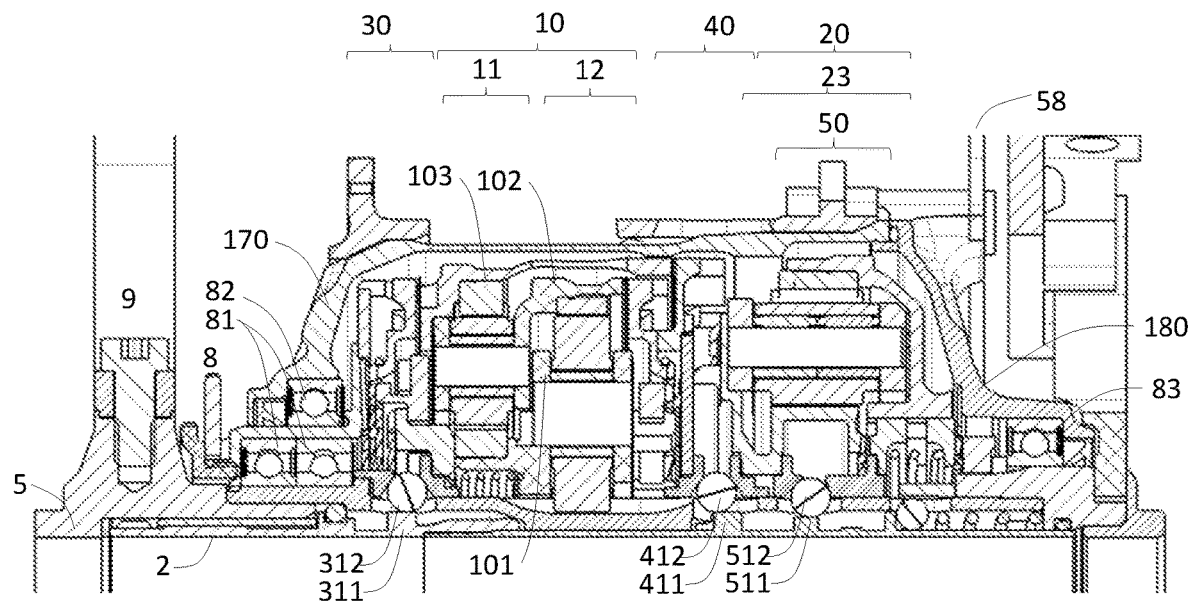
FIG. 3 illustrates half of a cross section of the multi speed gear system of the invention.
Figure 12A:
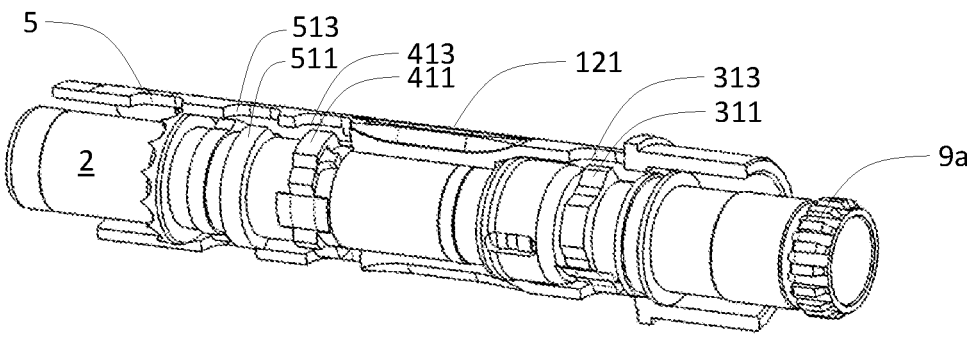
FIG. 12a, 12b, 12c illustrate in perspective and partly cut-away views the shift axle (2) arranged inside the main shaft (5).
Figure 12B:
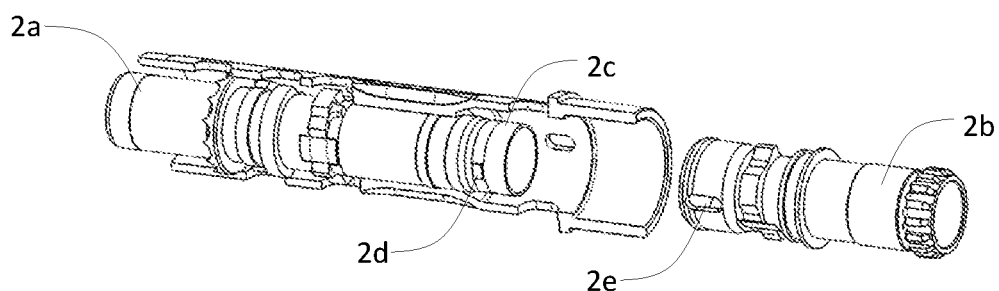
Figure 12C:
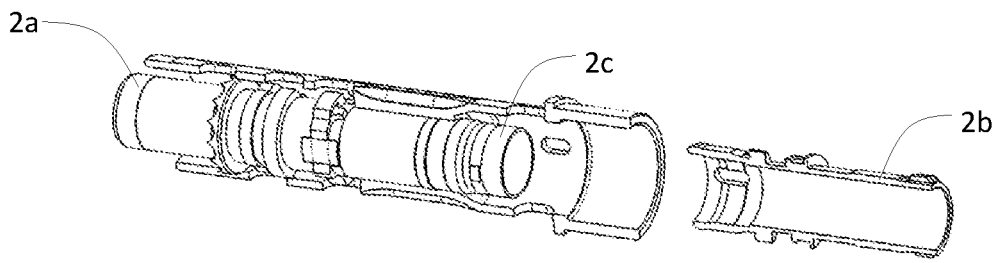

The height of the first, second, and third radial shift cams (311, 411, 511) vary along the circumference of the shift axle (2) and the cams are thus multilevel. The distance the shift balls (312, 412, 512) are pushed radially therefore depends on the angular position of the shift axle (2). A shift mechanism (9) is arranged to rotate the shift axle (2) to the right position. In FIGS. 1a and 1b the interior of the shift mechanism (15) is not shown, but it typically comprises an actuator arranged to rotate the shift axle (2). The shift axle (2) may have a shift wheel (9a), such as a toothed wheel, as illustrated in FIG. 12a, interfacing clutch arms of the actuator. It could also be operated by other means, such as chains belts etc.

The actual implementation of the first, second, and third shift mechanisms (30, 40, 50) will be explained later, but for illustration purposes, individual, first, inner, middle, and outer clutches (321, 322, 323) have been shown schematically in FIG. 1 for the first shift mechanism (30).

The first, inner, middle, and outer clutches (321, 322, 323) are arranged to releasably engage the first shaft (71) with the first, second, or third carrier elements (101, 102, 103), respectively. The radial position of the first ball (312) determines which of the first inner, middle, and outer clutches (321, 322, 323) that is/are operated.

Individual, second inner, middle, and outer clutches (421, 422, 423) have been illustrated in the same way for the second shift mechanism (40).

The second, inner, middle, and outer clutches (421, 422, 423) are arranged to releasably engage the second shaft (72a) with the first, second, or third carrier elements (101, 102, 103), respectively. The radial position of the second ball (412) determines which of the second inner, middle, and outer clutches (421, 422, 423) that is/are operated.

Third first and second clutches (521, 522) are illustrated to the right in FIG. 1 for the third shift mechanism (50). The third first and second clutches (521, 522) are configured, in a direct drive mode, to lock the third sun gear (231) to the third ring gear (233). In reduction mode, the connection between third sun gear (231) and the third ring gear (233) is disengaged, where the third ring gear (233) is held stationary with regard to the main shaft (5) and the second gear section (20) is operating with a reduction in gear ratio between the second shaft (72a) and the hub shell (3).

The actual implementation of the clutches and their operation will now be described in more detail.

FIG. 4a illustrates components of the first shift mechanism (30).

Some of the components have already been mentioned above, with reference to FIG. 1, such as the stationary main shaft (5), the first shaft (71), rotatably arranged about the main shaft (5), and the shift axle (2). Further, the first inner, middle, and outer carriers (101, 102, 103) can be seen. These carriers are also arranged to rotate about the main shaft (5).

The first shift mechanism (30) comprises on the inbound side a multilevel first inbound clutch element (350) and on the outbound side, first inner, middle, and outer clutch elements (351, 352, 353). The multilevel first inbound clutch element (350) is here extending radially and integrated with the first shaft (71). The first inner, middle, and outer clutch elements (351, 352, 353) interact with the first inner, middle, and outer carriers (101, 102, 103), respectively. For the understanding of the operation of the clutches, it is important to note how this interaction works.

First of all, each of the first inner, middle, and outer clutch elements (351, 352, 353) is rotationally fixed to the corresponding first inner, middle, and outer carrier (101, 102, 103). This has been illustrated in FIG. 4a with the upper parts of clutch elements overlapping the carriers. This means that one of the clutch elements is rotated, the corresponding carrier will rotate and vice-versa.

However, in the axial direction, the clutch elements are allowed to move a certain distance relative the carrier elements which are fixed in the axial direction relative the main shaft (5).

The clutch elements are therefore always rotationally fixed to the carriers, but may be axially moved in and out of engagement with the inbound clutch element (350).

The first inner, middle, and outer clutch elements (351, 352, 353) are pre-tensioned into engagement by corresponding first inner, middle, and outer resilient members (381, 382, 383) illustrated in FIG. 4a.

The collection of the multilevel first common clutch element (350) and the first inner clutch element (351) may be said to constitute the first inner clutch (321) illustrated in FIG. 1. Similarly, the collection of the multilevel first inbound clutch element (350) and the first middle clutch element (352) may be said to constitute the first middle clutch (322), and the collection of the multilevel first inbound clutch element (350) and the first outbound outer clutch element (353) may be said to constitute the first outer clutch (323).

The first inner, middle, and outer clutches (321, 322, 323) are all one-directional dog clutches and the first common clutch element (350) comprises one way first clutch teeth (360) facing towards the first inner, middle, and outer clutch elements (351, 352, 353), each comprising one way first inner, middle, and outer clutch teeth (361, 362, 363) at non-identical radiuses. The number of clutch teeth may be identical for the clutch elements. Since the teeth are one-way, the first inner, middle, and outer clutch (321, 322, 323) may therefore grip in one rotational direction and freewheel in the opposite direction when in an engaged axial position.

Further, the first shift mechanism (30) comprises an axially stationary first assist ring (331) and an axially movable first shift ring (341).

The first assist and first shift rings (331, 341) both have respective first assist and first shift conical surfaces (332, 342) interfacing the first shift ball (312) on axially opposite sides.

The multilevel first radial shift cam (311) is circumferentially arranged around the shift axle (2), and the first shift ball (312) is resting onto said first radial shift cam (311) within the first opening (313) of the main shaft (5).

It can also be seen that the first inner clutch element (351) is configured to move axially with the first shift ring (341) in the outbound direction, and the first outbound middle clutch element (352) is configured to move with the first outbound inner clutch element (351) in the same direction. The first inner clutch element (351) and the first shift ring (341) could in an embodiment be provided as a single element.

The operation of the first shift mechanism will now be explained with reference to FIGS. 4a, 4b and 4c. The same reference signs as in FIG. 4a apply to FIGS. 4b and 4c.

Before explaining how the clutches operate, it is important to understand that, due to the design of the multispeed gear system (1), the first outer carrier (103) will always rotate faster than the first middle carrier (102), which will rotate faster than the first inner carrier (101). It is therefore not possible to have more than one clutch element actively driving a carrier at the time.

In FIG. 4a, the shift axle (2) is positioned so that the first radial shift cam (311) is in its inner position, while the shift axle in FIG. 4b has been rotated to position the first radial shift cam (311) in a middle position. In FIG. 4c the radial shift cam (311) is arranged in an outer position as a result of further rotation of the shift axle (2).

When the radial shift cam (311) is in the inner position, as illustrated in FIG. 4a, the first shift ball (312) is in the lower position. This allows the inner resilient element to force the first shift ring (341) and the first inner clutch element (351) towards the first inbound clutch element (350). The first inner clutch element (351) is therefore in engagement with the first common clutch element (350), and can in this case be defined as the driving element, transferring torque from the first shaft (71) to the first inner carrier (101).

However, the first middle and outer clutch elements (352, 353) are also forced towards the first common clutch element (350), but since they rotate with a higher rotational speed than the first inner clutch element (351), they will freewheel.

In FIG. 4b, the radial shift cam (311) lifts the first shift ball (312) to a middle position. The first shift ball (312) will abut the assist and shift conical surfaces (332, 342) and force the first assist and shift rings (331, 341) apart. However, since only the first shift ring is (341) is movable, the entire axial movement as a result of the radial shift cam (311) lifting the first shift ball (312), has to be taken up by the first shift ring (341).

Since the first shift ring (341) is axially engaged with the first inner clutch element (351), the first inner clutch element (351) is axially moved out of engagement with the first common clutch element (350) to a disengaged position. The axial force from the shift mechanism has to overcome the force of the first inner resilient element (381). This allows the first middle clutch element (352), that was initially freewheeling, to engage, with the first common clutch element (350) by the help of the first middle resilient element (382), and to become the driving element, transferring torque from the first shaft (71) to the first middle carrier (102). However, the first outer clutch element (353) will still freewheel since it rotates faster than the first middle clutch element (352).

Moving on to FIG. 4c, the radial shift cam (311) lifts the first shift ball (312) further to an upper position. The first shift ball (312) will force the first assist and shift rings (331, 341) further apart, a movement that has to be taken up by the first shift ring (341) as explained above.

The first inner clutch element (351) is axially moved further in the outbound direction, and since the first inner clutch element (351) is axially engaged with the first middle clutch element (352), the first middle clutch element (352) is forced out of engagement with the first common clutch element (350) to a disengaged position. The axial force from the shift mechanism has to overcome the force of the first middle resilient element (382). This allows the first outer clutch element (353), that was initially freewheeling, to engage, with the first common clutch element (350) by the help of the first outer resilient element (383), and to become the driving element, transferring torque from the first shaft (71) to the first outer carrier (103).

As can be seen, the first outbound clutch teeth (361, 362, 363) are arranged to appear to form an axially, relatively planar surface extending relatively perpendicular to the main shaft (5).

As described above, the first inner, middle, and outer clutch elements (351, 352, 353) have an axial degree of freedom, so that they can engage and disengage with the axially fixed common clutch element (350) by an axial movement.

In order to allow this axial movement, the back side of the inner, middle, and outer clutch elements (351, 352, 353), opposite the first outbound clutch teeth (361, 362, 363), comprises first inner, middle, and outer clutch engagement means (371, 372, 373), arranged to rotationally engage with corresponding first inner, middle, and outer carrier engagement means (101a, 102a, 103a) of the first inner, middle, and outer carriers (101, 102, 103), respectively. In the illustrated embodiment, the clutch and carrier engagement means are axially directed slots and ears. The reference number have been indicated in FIG. 4b, and in FIGS. 4a, 4b and 4c, it can be observed how the clutch and carrier engagement means (371, 372, 373, 101a, 102a, 103a) slide axially relative each other when the clutch is operated and the clutches are freewheeling.

FIG. 5a illustrates components of the second shift mechanism (40).

Some of the components have already been mentioned above, with reference to FIG. 1, such as the stationary main shaft (5), the first shaft (71), rotatably arranged about the main shaft (5), and the shift axle (2). Further, the first inner, middle, and outer carriers (101, 102, 103) can be seen. These carriers are also arranged to rotate about the main shaft (5).

The second shift mechanism (40) comprises on the inbound side second inner, middle, and outer clutch elements (451, 452, 453), and on the outbound side a multilevel second common clutch element (450). The multilevel second common clutch element (450) is here extending radially and integrated with the second shaft (72a). The first inner, middle, and outer clutch elements (451, 452, 453) interact with the first inner, middle, and outer carriers (101, 102, 103), respectively. For the understanding of the operation of the clutches, it is important to note how this interaction works.

First of all, each of the second inner, middle, and outer clutch elements (451, 452, 453) are rotationally fixed to the corresponding carriers. This has been illustrated in FIG. 5a with the upper parts of clutch elements overlapping the carriers. This means that if the clutch element is rotated, the corresponding carrier will rotate and vice-versa.

However, in the axial direction, the second inner, middle, and outer clutch elements (451, 452, 453) are allowed to move a certain distance relative the respective first inner, middle, and outer carriers (101, 102, 103) which are fixed in the axial direction relative the main shaft (5).

The second inner, middle, and outer clutch elements (451, 452, 453) of the second shift mechanism (40) are therefore always rotationally fixed to the carriers, but may be axially moved in and out of engagement with the second common clutch element (450).

The second inner, middle, and outer clutch elements (451, 452, 453) are pre-tensioned into engagement by corresponding second inner, middle, and outer resilient members (481, 482, 483) illustrated in FIG. 5a.

The collection of the multilevel second common clutch element (450) and the second inner clutch element (451) may be said to constitute the second inner clutch (421) illustrated in FIG. 1. Similarly, the collection of the multilevel second common clutch element (450) and the second middle clutch element (452) may be said to constitute the second middle clutch (422), and the collection of the multilevel second common clutch element (450) and the second outer clutch element (453) may be said to constitute the second outer clutch (423).

The second inner, middle, and outer clutches (421, 422, 423) are all one-directional dog clutches and the second common clutch element (450) comprises one way second clutch teeth (460) facing towards the second inner, middle, and outer clutch elements (451, 452, 453), each comprising an identical number of corresponding one way second inner, middle, and outer clutch teeth (461, 462, 463) at non-identical radiuses. Since the teeth are one-way, the second inner, middle, and outer clutches (421, 422, 423) may therefore grip in one rotational direction and freewheel in the opposite direction when in an engaged axial position.

Further, the second shift mechanism (40) comprises an axially stationary second assist ring (431) and an axially movable second shift ring (441).

The second assist and shift rings (431, 441) both have respective second assist and shift conical surfaces (432, 442) interfacing the second shift ball (412) on axially opposite sides.

The multilevel second radial shift cam (411) is circumferentially arranged around the shift axle (2), and the second shift ball (412) is resting onto said second radial shift cam (411) within the second opening (413) of the main shaft (5).

The second outer clutch element (453) is configured to move axially with the second shift ring (441) away from the second common clutch element (450) when operated. Further, the second middle clutch element (452) is configured to move with the second outer clutch element (453) in the same direction. The second outer clutch element (453) and the second shift ring (441) could in an embodiment be provided as a single element.

The operation of the second shift mechanism will now be explained with reference to FIGS. 5a, 5b and 5c. The same reference signs as in FIG. 5a apply to FIGS. 5b and 5c, and vice-versa.

Where the first shift mechanism (30) is on the inward side of the first gear section (10), the inward clutches, i.e. the first inner, middle or outer clutches (321, 322, 323) are driving the corresponding carrier. However on the outward side of the first gear section (10), it is opposite, and it is the carriers that drive the corresponding second inner, middle or outer clutches (421, 422, 423) of the second shift mechanism (40). As stated above for the first shift mechanism, the first outer carrier (103) will always rotate faster than the first middle carrier (102) which will rotate faster than the first inner carrier (101). It is therefore not possible to have more than one carrier actively driving a clutch element at the time.

However, in order to obtain transmission of torque through the second shift mechanism (40), the clutches operate differently from the first gear mechanism (30). In the first shift mechanism (30), the first middle and outer clutch elements (352, 353) were freewheeling when the first inner clutch element (351) was the driving element. In the second shift mechanism (40), it is opposite. Here, the second inner and middle clutch elements (451, 452) are freewheeling when the second outer clutch element (453) is the driving element.

In order to obtain this, the second shift mechanism (40) comprises an axially movable second shift element (410), axially engaged with the second outer clutch element (453), but free to move axially relative the second inner and middle clutch elements (451, 452), indicated by the dashed line in FIGS. 5a, 5b and 5c.

In FIG. 5a, the shift axle (2) is positioned so that the second radial shift cam (411) is in its inner position, while the shift axle (2) in FIG. 5b has been rotated to position the second radial shift cam (411) in a middle position. In FIG. 5c the second radial shift cam (411) is arranged in an outer position as a result of further rotation of the shift axle (2).

When the second radial shift cam (411) is in the inner position, as illustrated in FIG. 5a, the second shift ball (412) is in the lower position. This allows the second outer resilient element (483) to force the second outer clutch element (453) towards the second common clutch element (450). The second outer clutch element (453) is therefore in engagement with the second common clutch element (450), and can in this case be defined as the driving element, transferring torque from the outer carrier (103) to the second shaft (72a).

However, the second middle and inner clutch elements (452, 451) are also forced towards the second common clutch element (450) by their respective second middle and inner resilient elements (482, 481), but they will freewheel.

In FIG. 5b, the second radial shift cam (411) is rotated and lifts the second shift ball (412) to a middle position. The second shift ball (412) will abut the second assist and shift conical surfaces (432, 442) and force the second assist and second shift rings (431, 441) apart. However, since only the second shift ring (441) is movable, the entire axial movement, as a result of the second radial shift cam (411) lifting the second shift ball (412), has to be taken up by the second shift ring (441).

The second shift element (410) is axially movable and engaged with the second shift ring (441). When the second shift ring (441) is moved axially, it will force the second outer clutch element (453) out of engagement from the second common clutch element (450) to a disengaged position. The axial force from the shift mechanism has to overcome the force of the second outer resilient element (483). This allows the second middle clutch element (452), that was initially freewheeling, to engage with the second common clutch element (450), by the help of the second middle resilient element (482), and to become the driving element, transferring torque from the first middle carrier (102) to the second shaft (72a). However, the second inner clutch element (451) will still freewheel.

Moving on to FIG. 5c, the second radial shift cam (411) lifts the second shift ball (412) further to an upper position.

The second shift ball (412) will force the second assist and shift rings (431, 441) further apart, a movement that has to be taken up by the second shift ring (441) as explained above.

The second shift element (410) will force the second outer clutch element (453) further away from engagement, and since the second outer clutch element (453) is axially engaged with the second middle clutch element (452), the second middle clutch element (452) is forced out of engagement from the second common clutch element (450), to a disengaged position.

The axial force from the shift mechanism has to overcome the force of the second middle resilient element (482). This allows the second inner clutch element (451), that was initially freewheeling, to engage with the second common clutch element (450) by the help of the second outer resilient element (483), and to become the driving element, transferring torque from the first inner carrier (101) to the second shaft (72a).

As described above, the second inner, middle, and outer clutch elements (451, 452, 453) have an axial degree of freedom, so that they can engage and disengage with the axially fixed second common clutch element (450) by an axial movement.

In order to allow this axial movement, the back side of the second inner, middle, and outer clutch elements (451, 452, 453), opposite the second outbound clutch teeth (461, 462, 463), comprises second inner, middle, and outer clutch engagement means (471, 472, 373), arranged to rotationally engage with corresponding second inner, middle, and outer carrier engagement means (101b, 102b, 103b) of the first inner, middle, and outer carriers (101, 102, 103), respectively.

In the illustrated embodiment, the clutch and carrier engagement means are axially directed slots and ears. The reference numbers have been indicated in FIG. 5b, and in FIGS. 5a, 5b and 5c, it can be observed how the clutch and carrier engagement means (471, 472, 473, 101b, 102b, 103b) slide axially relative each other when the clutch is operated and the clutches are freewheeling.

The third shift mechanism (50), shifting the second gear section (20), comprises a third clutch (521) and a fourth clutch (522) as seen in FIG. 1a. The third clutch (521) is operable between an engaged and disengaged state, and the fourth clutch (522) is an always engaged clutch freewheeling in non-torque-transferring direction.

In the same way as for the first and second shift mechanisms (30, 40), the third shift mechanism (50) has a third radial shift cam (511), operating a third shift ball (512).

In FIGS. 16a and 16b, more details about the third shift mechanism are illustrated: the stationary main shaft (5), the third shaft (73) rotatably arranged about the main shaft (5), the shift axle (2), the third radial shift cam (511) and the third shift ball (512), described previously. The third radial shift cam (511) operates the third shift ball (512) through the third opening (513) in the main shaft (5).

The collection of the third assist clutch element (550) and third shift clutch element (551) may be said to constitute the third clutch (521), and the collection of the fourth shift clutch element (553) and fourth assist clutch element (552) may be said to constitute the fourth clutch (522) illustrated in FIG. 1.

Figure 7E:
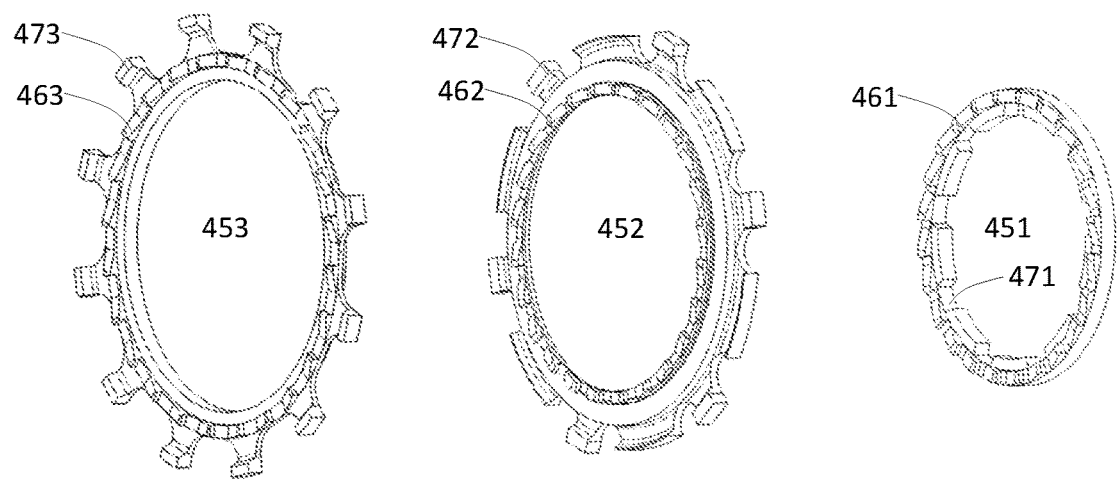
Figure 7F:
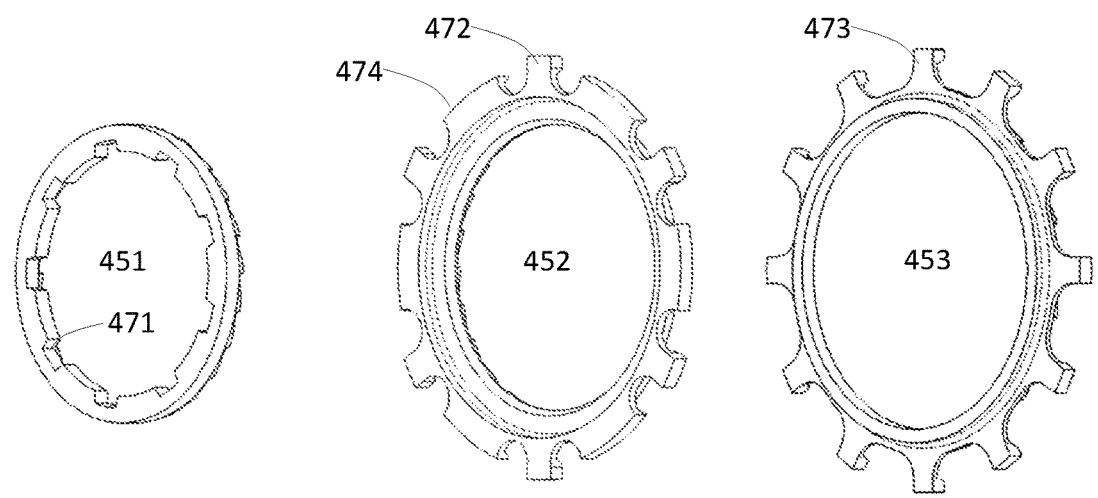
Figures 7G, 7H:
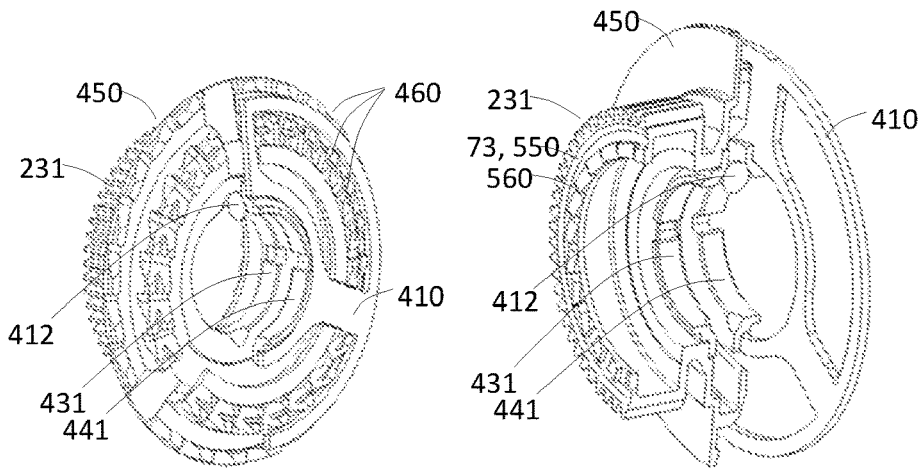
Figures 8A, 8B:
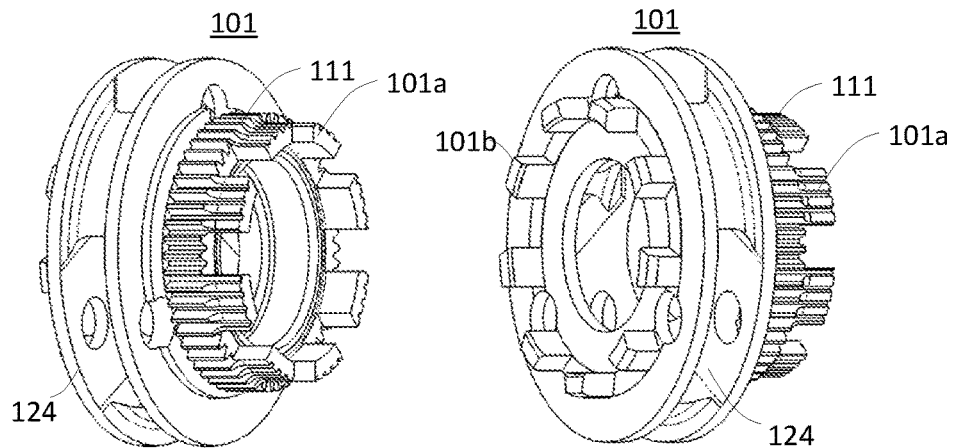
FIGS. 8a and 8b illustrate in perspective views a first inner carrier (101) integrated with the first sun gear (111).
Figures 9A, 9B:
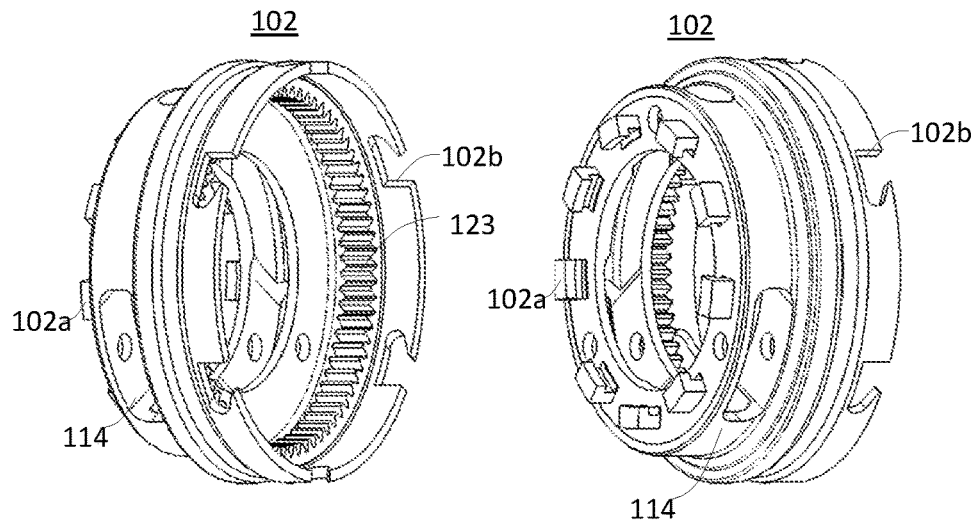
FIGS. 9a and 9b illustrate in perspective views a first middle carrier (102) integrated with the second ring gear (123).
Figure 10A:
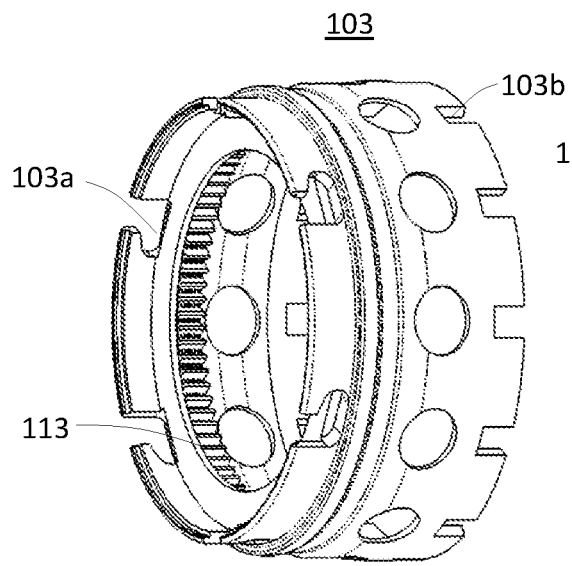
FIGS. 10a and 10b illustrate in perspective views a first outer carrier (103) integrated with the first ring gear (113).
Figure 10B:
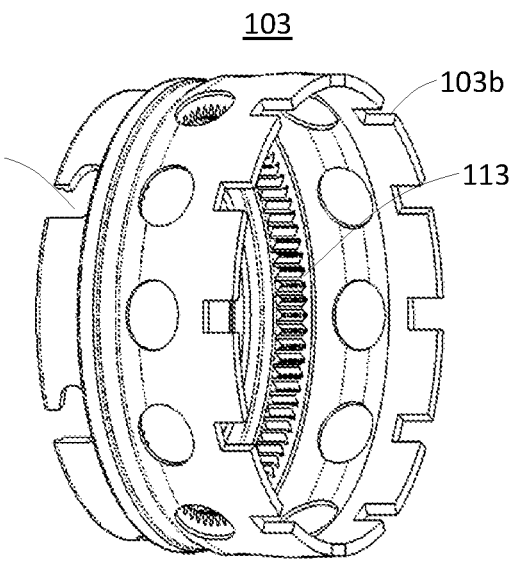
Figure 11:
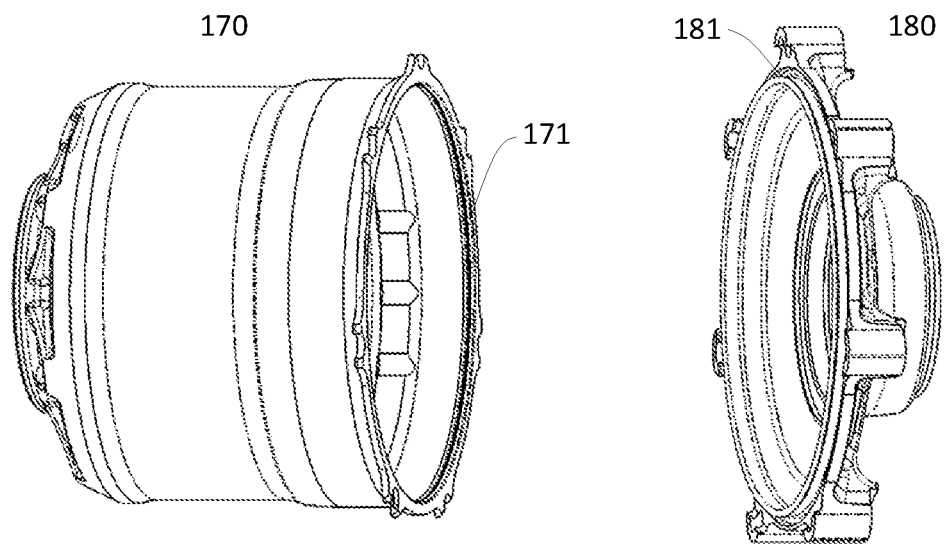
FIG. 11 illustrates in a perspective view a split hub shell (3) of an embodiment of the invention.

The third and fourth clutches (521, 522) are both one-directional dog clutches and the third assist clutch element (550) comprises one way assist clutch teeth (560) as illustrated e.g. in FIG. 7h, facing towards the third shift clutch element (551), comprising in an embodiment an identical number of corresponding one way third shift clutch teeth (561). Likewise, the fourth shift clutch element (553) comprises one way fourth shift clutch teeth (563) facing towards the fourth shift clutch element (552), comprising in an embodiment an identical number of corresponding one way fourth shift clutch teeth (562). Since the teeth are one-way, the third and fourth clutches (521, 522) may therefore grip in one rotational direction and freewheel in the opposite direction when in an engaged position.

In this case the third assist clutch element (550) is integrated with the third shaft (73) and the third sun gear (231), and axially fixed relative the main shaft (5). The second outer carrier (203) is rotationally fixed to the third ring gear (233), as illustrated in FIG. 1. The fourth shift clutch element (552) is axially fixed relative the main shaft (5).

The third shift clutch element (551) and the fourth shift clutch element (553) are rotationally fixed to the second outer carrier (203). This is illustrated in FIGS. 16a and 16b as the upper parts of said clutch elements are overlapping the second outer carrier (203) in the illustration. This means that if the third shift clutch element (551) or the fourth shift clutch element (553) are rotated, the third ring gear (233) will rotate along with them and vice versa. The third shift clutch element (551) is configured to move axially in and out of engagement with its corresponding counterpart, the third assist clutch element (550), while the fourth shift clutch element (553) is arranged to either be engaged with—or freewheel with respect to the fourth assist clutch element (552).

Both the third second clutch element (551) and the fourth first clutch element (552) are pretensioned into engagement by a third resilient element (581).

Further, the third shift mechanism (50) comprises an axially stationary third assist ring (531) and an axially movable third shift ring (541).

The third assist and shift rings (531, 541) have respective third assist and shift conical surfaces (532, 542) interfacing the third shift ball (512) on axially opposite sides.

The multilevel third radial shift cam (511) is circumferentially arranged around the shift axle (2), and the third shift ball (512) is resting onto said third radial shift cam (511) within the third opening (513) of the main shaft (5).

The operation of the third shift mechanism will now be explained with reference to FIGS. 16a and 16b. The same reference signs as in FIG. 16a apply to FIG. 16b.

In FIG. 16a, the shift axle (2) is positioned so that the third radial shift cam (511) is in its inner position, while the shift axle (2) in FIG. 16b has been rotated to position the third radial shift cam (511) in an outer position.

When the third radial shift cam (511) is in the inner position, as illustrated in FIG. 16a, the third shift ball (512) is in the lower position. This allows the third resilient element (581) to force the third second shift ring (541) and the third second clutch element (551) towards the third first clutch element (550). The third second clutch element (551) is therefore in engagement with the third first clutch element (550), and can in this case be defined as the driving element, transferring torque from the third shaft (73) to the third ring gear (233). However, in the fourth clutch (522) the fourth first clutch element (552) is also forced towards the third second clutch elements (553), but it will freewheel. In this position, the third shift mechanism (50) is in direct drive mode.

In FIG. 16b, the third radial shift cam (511) lifts the third shift ball (512) to an upper position. The third shift ball (512) will abut the third first and second conical surfaces (532, 542) and force the third first and third second shift rings (531, 541) apart. However, since only the third second shift ring is (541) is movable, the entire axial movement as a result of the third radial shift cam (511) lifting the third shift ball (512), has to be taken up by the third second shift ring (541). Since the third second shift ring (541) is axially engaged with the third second clutch element (551), the third second clutch element (551) is axially moved out of engagement from the third first clutch element (550) to a disengaged position. The axial force from the shift mechanism has to overcome the force of the third resilient element (581).

In this situation, the third sun gear (231) is no longer driving the third outer carrier (203) and the fourth clutch (522) will stop freewheeling and go into engagement. In this position, the third shift mechanism (50) is in reduction drive mode.

The following terms may be replaced by alternative terms in the application:
- the first clutch member of the first inner clutch (321) may be the inner radial level of the first common clutch element (350).
- the first clutch member of the first middle clutch (322) may be the middle radial level of the first common clutch element (350).
- the first clutch member of the first outer clutch (323) may be the outer radial level of the first common clutch element (350).
- the first clutch member of the second inner clutch (421) may be the inner radial level of the second common clutch element (450).
- the first clutch member of the second middle clutch (422) may be the middle radial level of the second common clutch element (450).
- the first clutch member of the second outer clutch (423) may be the outer radial level of the second common clutch element (450).
- the second clutch member of the first inner clutch (321) may be the first inner clutch element (351).
- the second clutch member of the first middle clutch (322) may be the first middle clutch element (352).
- the second clutch member of the first outer clutch (323) may be the first outer clutch element (353).
- the second clutch member of the second inner clutch (421) may be the second inner clutch element (451).
- the second clutch member of the second middle clutch (422) may be the second middle clutch element (452).
- the second clutch member of the second outer clutch (423) may be the second outer clutch element (453).

Coasting Clutch

A problem related to dog clutches in general when they are freewheeling, or overrunning, is that they generate some mechanical clicking noise, increasing in frequency with the difference in speed between the two interfacing and freewheeling clutch elements. This occurs when the teeth of one clutch element jumps over the teeth of the other. The noise is a result of friction that will also reduce the efficiency in freewheeling mode. I.e., the friction forces tend to lag free rotation.

It is therefore a need for an improvement of freewheeling dog clutches in order to reduce noise and lag.

In the following, the invention is in an aspect a coasting clutch, which is an improved freewheeling dog clutch where noise and lag is reduced. The coasting clutch may be implemented in one or more of the clutches of the multispeed gear system described above, or in any other gear system or transmission of pedally propelled vehicles.

The coasting clutch may also be used as part of any type of transmission, such as in manual, automatic, and semiautomatic automotive gear boxes, as well as transmissions in hybrid and future multispeed solutions for electric vehicles, to mention a few.

FIGS. 13a, 13b and 13c illustrate an embodiment of a coasting clutch (621) with coasting means (610) that may be combined with any of the clutches of a transmission, such as the multispeed gear system disclosed previously.

If we first consider the first and second clutch elements (650, 651) in FIG. 13a, the first clutch element (650) is the driving element. In the engaged position (e), and as long as the first clutch element is driving the second clutch element (651), the one-way first and second clutch teeth (660, 661) are engaged and the two clutch elements rotate with the same speed, as indicated by the arrows in FIG. 13a.

In the disengaged position (d), illustrated in FIG. 13c, the first and second clutch teeth (660, 661) are not in contact and the first and second clutch elements (650, 651) may rotate independently of each other, as indicated by the double arrow.

To illustrate relative axial movement, a dotted line indicating a fixed axial position has been added to the drawings.

The actual clutch engagement and disengagement mechanism is not shown in the figure. However, it may be e.g. a standard engagement and disengagement mechanism, as understood by a person skilled in the art, or the one disclosed for the multispeed gear system above.

FIG. 13b illustrate the first and second clutch elements (650, 651) in prior art freewheeling position (f), to the left, and in the coasting position (c) to the right. The coasting position (c) may be seen as an improved freewheeling position.

The term coasting clutch (621), used to the distinguish the invention from prior art, may therefore be seen as an improved freewheeling clutch.

Freewheeling occurs when the second clutch element (651) rotates faster than the first clutch element (650). For the purpose of illustration of the invention, the second clutch element (651) has been selected as the steady rotational reference, which means that the first clutch element (650) rotates backwards, i.e. against driving direction, as indicated by the arrow, when the clutch is freewheeling.

In a typical prior art freewheeling position (f), the second clutch element (651) would move axially back and forth a freewheeling distance (d1) every time the first clutch teeth (660) climb over the second clutch teeth (661). This generates a mechanical clicking noise and is responsible for a certain lag in the transmission.

In the right part of FIG. 13b, the coasting clutch (621) is in the coasting position (c). In the coasting position the coasting axial range (d2) is much shorter than the freewheeling axial range (d1) in the freewheeling position (f) to the left. The freewheeling noise and lag is therefore considerably lower.

The reason is that the coasting means (610) retains the second clutch element (651) in an axial position where the second clutch teeth (661) barely touches the first clutch teeth (660) during freewheeling.

The coasting (610) means comprises first and second retention members (611, 612).

The second retention member (612) is fixed to the second clutch member (651) both in rotational and axial directions.

The first retention member (611) is axially fixed to the first clutch member (650), but is free to move relative its rotational direction.

The interaction or touching of the teeth (660, 661) as a result of freewheeling, will force the second clutch member (651) axially away from the first clutch member (650), and the first clutch member (650) will further try to rotate the second clutch member (651) in its own rotational direction. In the right part of FIG. 13b, this means that the interaction between the teeth will try to push the second clutch member (651) right and in an upward rotation, which is illustrated as a downward rotation of the first clutch member (650), since the second clutch member (651) is the rotational reference.

The second retention member (612) will therefore be pushed onto an edge or ramp, of the first retention member (611), until a balance is reached where the second clutch teeth (661) barely touches the first clutch teeth (660). This is defined as the coasting position.

The coasting clutch remains in the coasting position (c) until the situation changes and the first clutch element (650) starts spinning faster than the second clutch element (651) in the driving direction. The balanced situation will no longer persist and the second clutch element (651) will quickly be reset to the engaged position in FIG. 13a, with the help of the coaster resilient element (681).

An alternative embodiment of the coasting clutch (621) is shown in FIGS. 13d, 13e and 13f, where the clutch is in engaged (e), coasting (c) and disengaged positions (d), respectively. The first retention means is here implemented as a slot, or opening in a carrier of an epicyclical gear series.

Figure 14A:
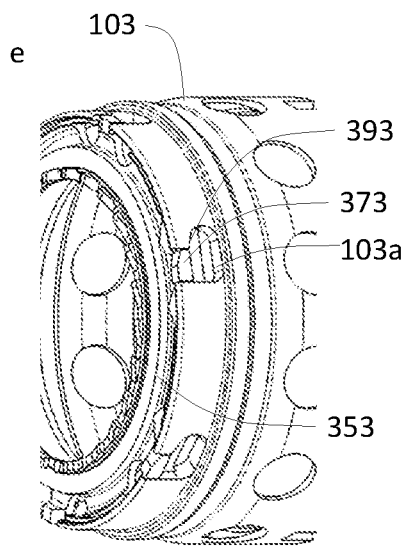
FIGS. 14a, 14b, and 14c illustrate in perspective and partly cut-away views the coasting means for the first outer clutch element (353).
Figure 14B:
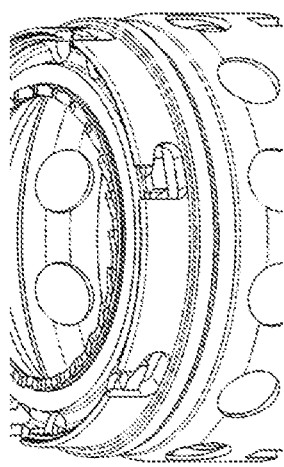
Figure 14C:
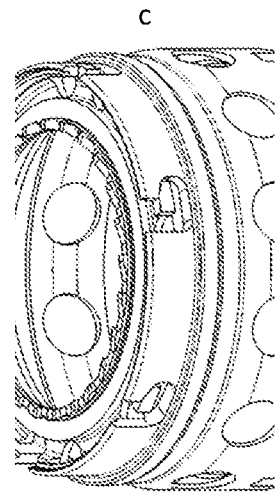
Figure 14D:
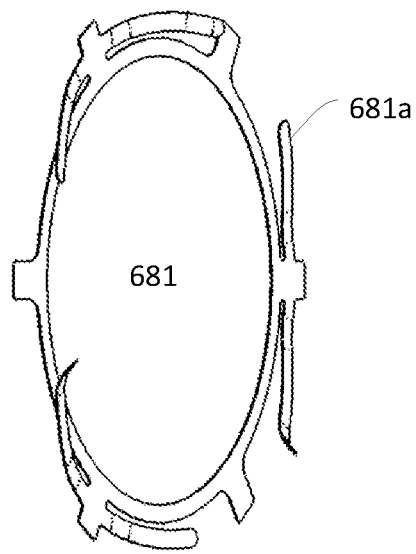
FIG. 14d illustrates in a perspective view a first outer resilient element (681) formed as a finger disc spring, that may be used in the assembly in FIGS. 14a, 14b and 14c. Similar resilient elements may be used in the other radial clutches of the first, second and third shift mechanisms (30, 40, 50).
Figure 14E:
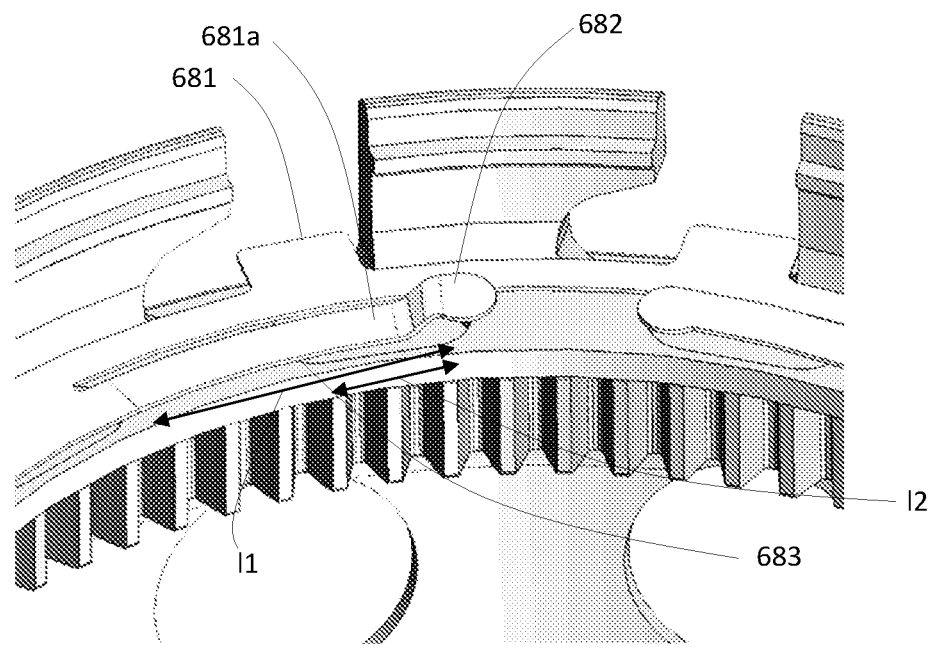
FIGS. 14e, 14f, 14g, and 14h illustrate an embodiment of a detention mechanism with a finger disc spring (681) that provides a larger spring force when driving in engaged position (e) than in coasting position (c).
Figure 14F:
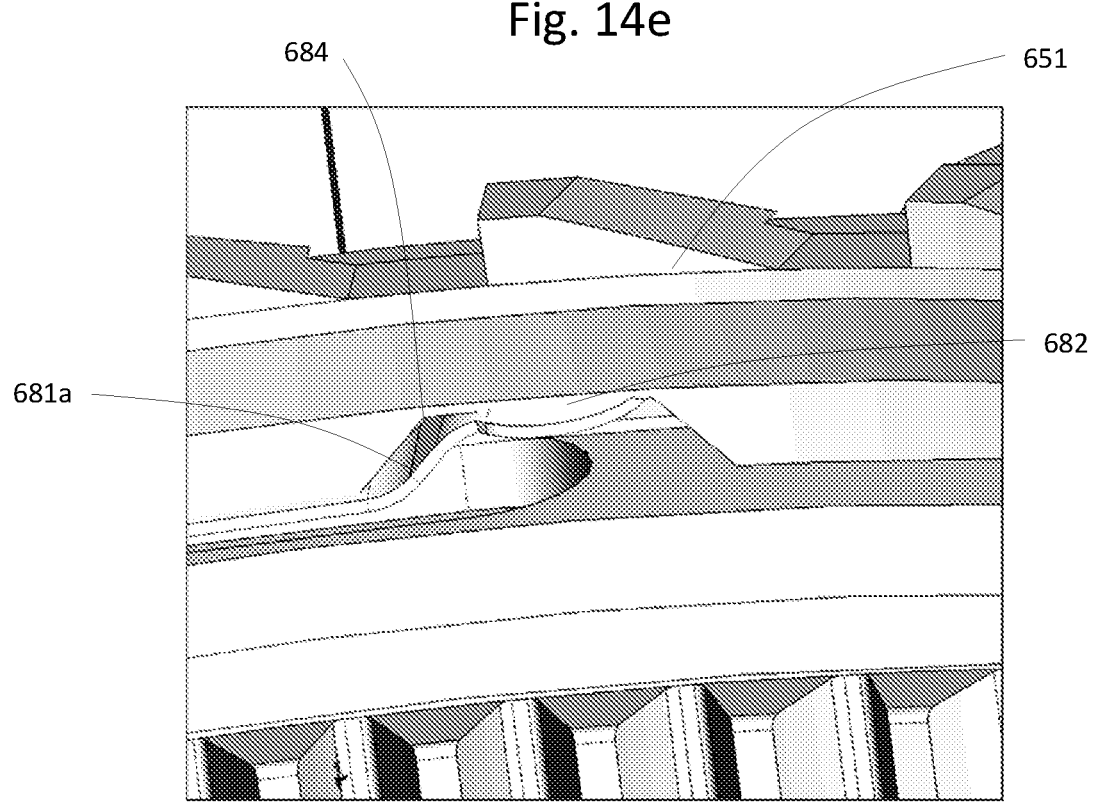
Figure 14G:
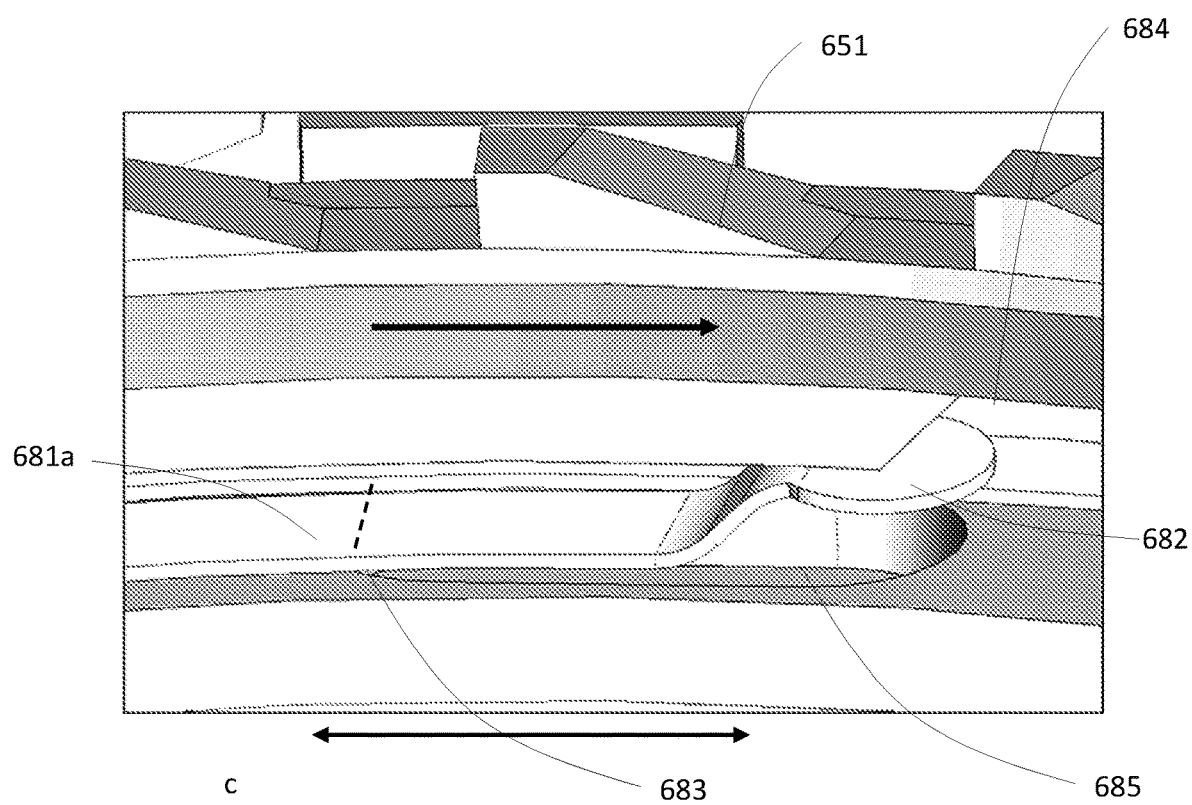
Figure 14H:
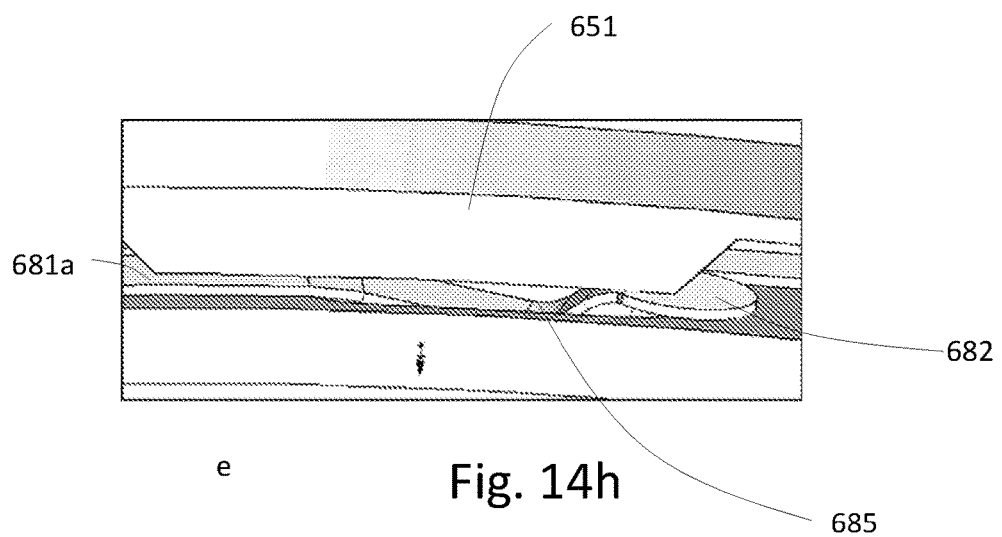

In an embodiment, illustrated in FIGS. 14a, 14b and 14c, the first outer clutch (323) of the first clutch mechanism (30) of the multi speed gear system described previously, is a coasting clutch with outer coasting means as described above. The outer coasting means reduces noise and improves efficiency of the first outer clutch (323).

In this embodiment, the coasting means have been implemented without adding additional components.

The first outer clutch element (353), corresponding to the second clutch element (651) in FIG. 13a to 13f, is rotatably connected and aligned with the first outer carrier (103) by the first outer clutch engagement means (373) and first outer carrier engagement means (103a) that are allowed to move axially relative each other. The first outer clutch element (353) is further pre-tensioned by the first outer resilient element (383) towards the first common clutch element (350) as explained previously, and illustrated in FIGS. 4a, 4b and 4c.

When the first outer clutch element (353) is engaged, as in FIG. 14a, it is driven clockwise and the first outer clutch engagement means (373) will force clockwise rotation of the first outer carrier (103) since the first outer clutch engagement means (373) will act on the lower edge of the first outer carrier engagement means (103a) implemented as axial indentations in the first outer carrier (103).

When the first outer clutch element (353) is freewheeling, as in FIG. 14c, it is overrunning the first common clutch element (350), and the first outer clutch teeth (363) and the first outer clutch engagement means (373) will be pushed towards the first outer carrier (103) when they interact with the opposing first clutch teeth (360). In this position, the first retention member (612) in the form of the first outer clutch engagement means (373), interface the second retention member (612) in the form of the first outer carrier engagement means (103a) with a pocket with a wedged first outer coasting surface (393) extending sideways from the indentation in a direction corresponding to the force of the freewheeling, or opposite the normal driving direction of the first outer carrier (103). Forces from freewheeling continues to push and rotate the first outer clutch element (353), and the first outer clutch engagement means (373) will now start climbing the wedged first outer coasting surface (393) until it reaches the coasting position (c) in FIG. 14c, where the teeth are barely in contact during freewheeling.

As soon as overrunning ends, the sequence will be reversed. The small interaction of the teeth of the two sides of the first outer clutch (323) is sufficient to rotate the first outer clutch element (353) back, where the first outer clutch engagement means (373) slides on the wedged first outer coasting surface (393), into the main indentation by the first outer resilient element (383).

Further, the first middle clutch element (352) may also have similar middle coasting means, as illustrated in FIGS. 15a, 15b and 15c, wherein the first middle clutch engagement means (372) climbs a wedged first middle coasting surface (392) of a pocket of first middle carrier first engagement means (102a) until it reaches the coasting position in FIG. 15c.

Similar coasting means may in an embodiment be implemented also for the second shift mechanism (40), and any other one-way dog clutches, both clutches that are operated between engaged and disengaged positions, and non-operated clutches that are only in driving engaged position or overrunning.

In the following, a number of embodiments with prefix EC of the coasting clutch are disclosed.

In a first independent embodiment; EC-1, the coasting clutch (621) comprises;
  mutually facing first and second clutch members (650, 651);
wherein the coasting clutch (621) is arranged to operate in an engaged position (e) wherein the first and second clutch members (650, 651) are axially in mesh and rotating with the same speed, or overrunning and rotating with different speeds, wherein the coasting clutch (621) further comprises coasting means (610) arranged to operate the coasting clutch (621) into a coasting position (c) when the clutch (621) is overrunning, and wherein the coasting position (c), the first and second clutch members (650, 651) are axially arranged further from each other than in the engaged position (e).

EC-2. The coasting clutch (621) of EC-1, wherein the coasting means (610) is arranged to screw the second clutch member (651), in the rotational direction of the first clutch member (650), into the coasting position (c) when the clutch (621) is overrunning.

EC-3. The coasting clutch (621) of EC-1 or EC-2, wherein the coasting means (610) is arranged to unscrew the second clutch member (651), in the direction of the first clutch member (650), out of the coasting position (c) when the clutch (621) is not overrunning.

EC-4. The coasting clutch (621) of any of EC-1 to EC-3, wherein energy for operating the clutch (621) into a coasting position (c), is derived from relative axial movement between the first and second clutch members (650, 651) when the clutch (621) is overrunning.

EC-5. The coasting clutch (621) of any of EC-1 to EC-4, wherein the coasting means (610) is arranged to screw the second clutch member (651), in the rotational direction of the first clutch member (650), and limit axial movement of the second clutch member (651) relative the first clutch member (650), to a coasting axial range (d2), as long as the clutch (621) is overrunning.

The coasting axial range (d2) is more limited than a freewheeling axial range (d1) that would be the case without the coasting means (610).

EC-6. The coasting clutch (621) of any of EC-2 to EC-5, wherein the coasting means (610) comprises;

an first retention member (611) fixed axially relative the first clutch member (650), and a second retention member (612) fixed axially and rotationally relative the second clutch member (651).

EC-7. The coasting clutch (621) of EC-6, wherein the second retention member (612) is arranged to climb the first retention member (611) when the clutch (621) is overrunning.

EC-8. The coasting clutch (621) of EC-6 or EC-7, wherein any of the first and second retention members (611, 612) has wedged interfacing surfaces arranged to interface the other retention member (612, 611).

EC-9. The coasting clutch (621) of EC-8, wherein any of the wedged interfacing surfaces are arranged inclined relative a mating interface between the first and second clutch members (650, 651).

EC-10. The coasting clutch (621) of any of EC-8 to EC-9, any of the wedged interfacing surfaces is increasingly curved towards an axial direction.

EC-11. The coasting clutch (621) of any of EC-6 to EC-10, wherein the coasting clutch (621) comprises radial alignment means arranged to keep the first and second clutch members (650, 651) mutually radially aligned when the clutch (621) is in the coasting position (c).

Figure 6E:
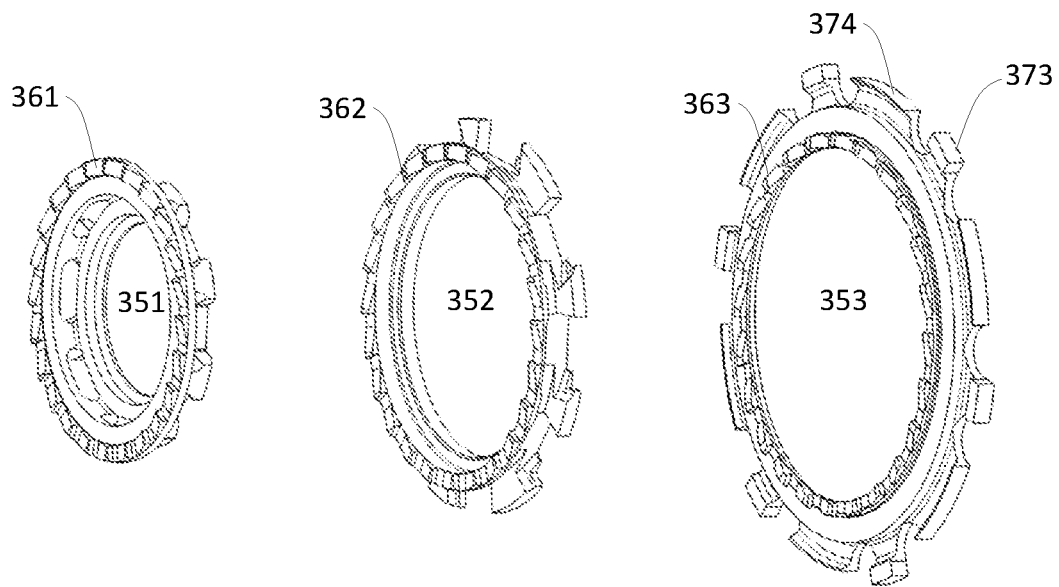
Figure 6F:
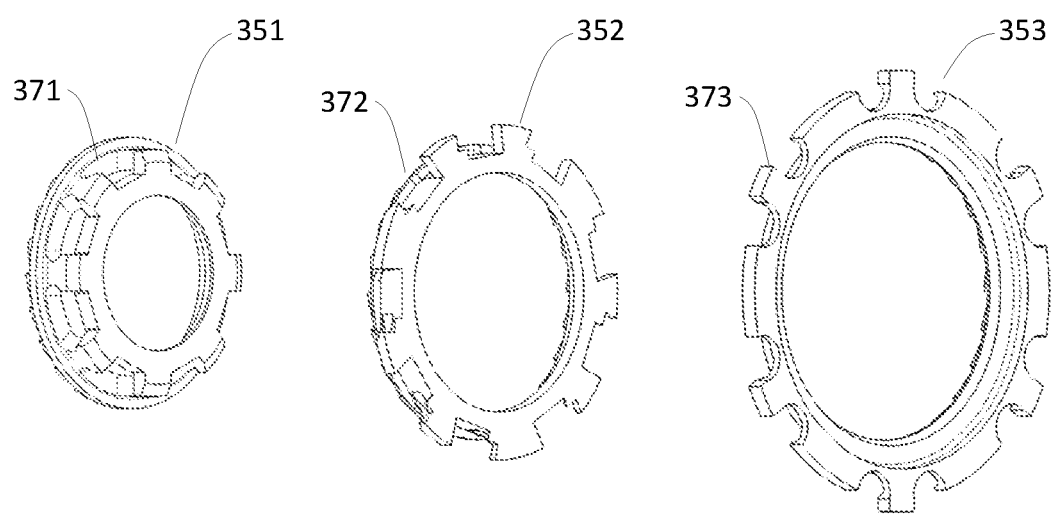

The radial alignment means could e.g. be sector formed extension on the first outer clutch element (353) such as the first outer radial alignment means (374), illustrated in e.g. FIG. 6c, or the second middle radial alignment means (474) for the second middle clutch element (452). In these examples, the alignment means are adapted to slide inside the walls of the corresponding carrier elements to obtain radial stability.

In order to further improve the coasting clutch (621) disclosed in the first independent coasting embodiment above, the invention also comprises in an embodiment adaptive resilience means as illustrated in FIGS. 14a, 14b, 14c, 14d, 14e, 14f, 14g and 14h. Although this illustrates the multispeed gear system explained above, similar embodiments could be used in other transmissions.

In FIG. 14a, the coasting clutch is in driving position (e) and the first outer clutch engagement means (373) abuts the radial surface of the first outer carrier engagement means (103a) and rotates the first outer carrier (103) when driven by the first clutch element (no shown). In this case the adaptive resilience is relatively large, forcing the second clutch element (651) into engagement with the first clutch element.

In the coasting position (c) in FIG. 14c, the first and second clutch elements (650, 651) are forced out of engagement by the clutch teeth, and the first outer clutch engagement means (373) climbs the first outer coasting surface (393). In the coasting position (c) the adaptive resilience is smaller than in the engaged position (e), but the angle of the coasting surface (393) is configured to allow the adaptive resilience means to push the second clutch element (651) outwards with a small force in the coasting position (c). The angle of the first outer coasting surface (393) is then steeper than the angle of friction.

FIG. 14b illustrates an intermediate position between the engaged position (e) and the coasting position (c).

EC-12. The coasting clutch (621) of any of EC-6 to EC-11, wherein a resilient element (681) arranged to force the second clutch member (650) into the engaged position (e).

EC-13. The coasting clutch (621) of EC-12, wherein the resilient element (681) is configured to push the second clutch member (651) towards the first clutch member (651) with a larger force in the engaged position (e) than in the coasting position (c).

EC-14. The coasting clutch (621) of any of EC-12 to EC-13, wherein the second retention member (612) is arranged to be rotated relative the first clutch member (650) when the coasting clutch (621) changes from the engaged position (e) to the coasting position (c), wherein the resilient characteristics of the resilient element (681) is configured to change as a function of the rotation.

EC-15. The coasting clutch (621) of any of EC-12 to EC-14, wherein the resilient element (681) is a finger spring washer, where the length of the active finger (681a) in the finger spring washer is a function of rotation.

As a result, the resilient characteristics of the resilient element (681) will then depend on the length of the active finger (681a).

EC-16. The coasting clutch (621) of EC-25, wherein a first length (l1) of the active finger (681a) in the coasting position (c) is longer than a second length (l2) of the active finger (681a) in the engaged position (e).

EC-17. The coasting clutch (621) of any of EC-15 to 16, wherein a finger tip (682) of the active finger (681a) is curved towards the second clutch member (651).

EC-18. The coasting clutch (621) of any of EC-15 to 17, wherein the second clutch member (651) comprises a recess (684) towards the active finger (681a), wherein the finger tip (682) is arranged to be hosted in the recess when the coasting clutch (621) is in the coasting position (e), and outside the recess when coasting clutch (621) is in the engaged position (e).

EC-19. The coasting clutch (621) of any of EC-15 to 18, the active finger (681a) is arranged between the second clutch member (651) and a support, wherein the support comprises an edge (683) between the start of the finger and the finger tip (682), wherein the finger tip (682) is arranged to flex flexes about the edge (683) when the coasting clutch (621) is in the engaged position (e).

EC-20. The coasting clutch (621) of any of EC-15 to EC-19, the support comprises a support recess (685) arranged to receive the finger tip (682) when the coasting clutch (621) is in the disengaged position (d).

The support recess may start from the edge (683) and be equal to or longer than the first length (l1). The recess or space from the edge (683) towards the finger tip (682) allows the first and second clutch elements (650, 651) to be disengaged when e.g. changing gears.

The support may be one of the carrier means described previously.

The coasting clutch disclosed in any of the coasting embodiments E-1 to E-20 may be combined with any of the embodiments EG-1 to EG-66, where any of the first and second inner, middle and outer clutches (321, 322, 323, 421, 422, 423) and third or fourth clutches (521, 621) are coasting clutches according to any of E1 to E-20.

In the exemplary embodiments, various features and details are shown in combination. The fact that several features are described with respect to a particular example should not be construed as implying that those features by necessity have to be included together in all embodiments of the invention. Conversely, features that are described with reference to different embodiments should not be construed as mutually exclusive. As those with skill in the art will readily understand, embodiments that incorporate any subset of features described herein and that are not expressly interdependent have been contemplated by the inventor and are part of the intended disclosure. However, explicit description of all such embodiments would not contribute to the understanding of the principles of the invention, and consequently some permutations of features have been omitted for the sake of simplicity or brevity.

The invention claimed is:

1. A coasting clutch comprising:
mutually facing first and second clutch members,
wherein the coasting clutch is arranged to operate in an engaged position when the first and second clutch members are axially in mesh and rotating with the same speed or overrunning and rotating with different speeds,
wherein the coasting clutch further comprises coasting means arranged to operate the coasting clutch into a coasting position when the clutch is overrunning,
wherein in the coasting position, the first and second clutch members are axially arranged further from each other than in the engaged position,
wherein the coasting means is arranged to screw the second clutch member, in the rotational direction of the first clutch member, into the coasting position when the clutch is overrunning, and
wherein the coasting means is arranged to limit axial movement of the second clutch member relative the first clutch member, to a coasting axial range, as long as the clutch is overrunning.

2. The coasting clutch of claim 1, wherein the coasting means comprises:
a first retention member fixed axially relative the first clutch member; and
a second retention member fixed axially and rotationally relative the second clutch member,
wherein the second retention member is arranged to climb the first retention member when the clutch is overrunning.

3. The coasting clutch of claim 2, wherein a resilient element is arranged to force the second clutch member into the engaged position.

4. A multi speed gear system comprising a gear mechanism, the gear mechanism comprising:
a main shaft;
a hollow first shaft and a hollow second shaft, both of the first and second shafts being axially stationary and rotatably arranged about the main shaft;
an epicyclical first gear section arranged about the main shaft between the first and second shafts, and comprising two radially stacked carrier elements; and
a first shift mechanism arranged between the first shaft and the first gear section, and configured to rotationally engage the first shaft with one of the two radially stacked carriers,
wherein the first shift mechanism comprises two first clutches radially stacked about the main shaft, and
wherein at least one of the two first clutches is a coasting clutch according to claim 1.

5. A multi speed gear system comprising a gear mechanism, the gear mechanism comprising:
a main shaft;
a hollow first shaft and a hollow second shaft, both of the first and second shafts being axially stationary and rotatably arranged about the main shaft;
an epicyclical first gear section arranged about the main shaft between the first and second shafts, and comprising two radially stacked carrier elements; and
a first shift mechanism arranged between the first shaft and the first gear section, and configured to rotationally engage the first shaft with one of the two radially stacked carriers,
wherein the first shift mechanism comprises two first clutches radially stacked about the main shaft, and
wherein at least one of the two first clutches is a coasting clutch according to claim 2.

6. A multi speed gear system comprising a gear mechanism, the gear mechanism comprising:
a main shaft;
a hollow first shaft and a hollow second shaft, both of the first and second shafts being axially stationary and rotatably arranged about the main shaft;
an epicyclical first gear section arranged about the main shaft between the first and second shafts, and comprising two radially stacked carrier elements; and
a first shift mechanism arranged between the first shaft and the first gear section, and configured to rotationally engage the first shaft with one of the two radially stacked carriers,
wherein the first shift mechanism comprises two first clutches radially stacked about the main shaft, and
wherein at least one of the two first clutches is a coasting clutch according to claim 3.

7. A coasting clutch comprising:
mutually facing first and second clutch members,
wherein the coasting clutch is arranged to operate in an engaged position when the first and second clutch members are axially in mesh and rotating with the same speed or overrunning and rotating with different speeds,
wherein the coasting clutch further comprises coasting means arranged to operate the coasting clutch into a coasting position when the clutch is overrunning,
wherein in the coasting position, the first and second clutch members are axially arranged further from each other than in the engaged position, and
wherein energy for operating the clutch into a coasting position, is derived from relative axial movement between the first and second clutch members when the clutch is overrunning, and
wherein the coasting means is arranged to screw the second clutch member, in the rotational direction of the first clutch member, and limit axial movement of the second clutch member relative the first clutch member, to a coasting axial range, as long as the clutch is overrunning.

8. The coasting clutch of claim 7, wherein the coasting means comprises:
a first retention member fixed axially relative the first clutch member; and
a second retention member fixed axially and rotationally relative the second clutch member,
wherein the second retention member is arranged to climb the first retention member when the clutch is overrunning.

9. The coasting clutch of claim 8, wherein a resilient element is arranged to force the second clutch member into the engaged position.

10. A multi speed gear system comprising a gear mechanism, the gear mechanism comprising:
a main shaft;
a hollow first shaft and a hollow second shaft, both of the first and second shafts being axially stationary and rotatably arranged about the main shaft;

an epicyclical first gear section arranged about the main shaft between the first and second shafts, and comprising two radially stacked carrier elements; and a first shift mechanism arranged between the first shaft and the first gear section, and configured to rotationally engage the first shaft with one of the two radially stacked carriers, wherein the first shift mechanism comprises two first clutches radially stacked about the main shaft, and wherein at least one of the two first clutches is a coasting clutch according to claim 7.

11. A multi speed gear system comprising a gear mechanism, the gear mechanism comprising:

a main shaft;

a hollow first shaft and a hollow second shaft, both of the first and second shafts being axially stationary and rotatably arranged about the main shaft;

an epicyclical first gear section arranged about the main shaft between the first and second shafts, and comprising two radially stacked carrier elements; and a first shift mechanism arranged between the first shaft and the first gear section, and configured to rotationally engage the first shaft with one of the two radially stacked carriers, wherein the first shift mechanism comprises two first clutches radially stacked about the main shaft, and wherein at least one of the two first clutches is a coasting clutch according to claim 9.

12. A multi speed gear system comprising a gear mechanism, the gear mechanism comprising:

a main shaft;

a hollow first shaft and a hollow second shaft, both of the first and second shafts being axially stationary and rotatably arranged about the main shaft;

an epicyclical first gear section arranged about the main shaft between the first and second shafts, and comprising two radially stacked carrier elements; and a first shift mechanism arranged between the first shaft and the first gear section, and configured to rotationally engage the first shaft with one of the two radially stacked carriers, wherein the first shift mechanism comprises two first clutches radially stacked about the main shaft, and wherein at least one of the two first clutches is a coasting clutch according to claim 8.

* * * * *